US009860746B2

(12) United States Patent
Miyamoto

(10) Patent No.: US 9,860,746 B2
(45) Date of Patent: Jan. 2, 2018

(54) OPERATION MANAGEMENT SYSTEM, CONTROL SYSTEM AND OPERATION CONTROL METHOD

(71) Applicant: FUJIFILM Corporation, Tokyo (JP)

(72) Inventor: Kentaro Miyamoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 536 days.

(21) Appl. No.: 13/794,620

(22) Filed: Mar. 11, 2013

(65) Prior Publication Data

US 2013/0241693 A1  Sep. 19, 2013

(30) Foreign Application Priority Data

Mar. 14, 2012  (JP) ................ 2012-056751

(51) Int. Cl.
*H04W 12/06* (2009.01)
*H04W 84/12* (2009.01)

(52) U.S. Cl.
CPC ............ *H04W 12/06* (2013.01); *H04W 84/12* (2013.01)

(58) Field of Classification Search
CPC ..... H04W 12/06; H04W 84/12; H04W 88/06; H04W 88/10; G06Q 20/3278; H04L 63/20
See application file for complete search history.

(56) References Cited

U.S. PATENT DOCUMENTS 5,490,139 A * 2/1996 Baker et al. ............ 370/312
6,013,107 A * 1/2000 Blackshear et al. ....... 709/229
7,346,338 B1 * 3/2008 Calhoun et al. ........... 455/411

(Continued)

FOREIGN PATENT DOCUMENTS

JP  2003-259417 A  9/2003
JP  2005-303459 A  10/2005

(Continued)

OTHER PUBLICATIONS

Notice of Reasons for Rejection dated Mar. 4, 2014 (with Partial English language Translation).

*Primary Examiner* — Nay Tun
(74) *Attorney, Agent, or Firm* — McGinn IP Law Group, PLLC

(57) ABSTRACT

An operation management system includes an authentication system and a control system. The authentication system includes a first terminal identification information reception unit that receives terminal identification information from an operation portable terminal device as the terminal device enters an authentication zone, and a terminal identification information transmission unit that transmits the identification information to the control system. The control system includes a second terminal identification information reception unit that receives the identification information from the terminal identification information transmission unit, a first terminal identification information storage unit that stores the identification information, a third terminal identification information reception unit that receives the identification information from the terminal device, and a permission unit that permits operation of the control system by the terminal device as the identification information received by the third terminal identification information reception unit is stored in the first terminal identification information storage unit.

17 Claims, 25 Drawing Sheets

(56) References Cited

U.S. PATENT DOCUMENTS

| | | | | |
|---|---|---|---|---|
| 2005/0233744 | A1* | 10/2005 | Karaoguz | H04W 12/08 455/432.3 |
| 2009/0262716 | A1* | 10/2009 | Kawakami | 370/338 |
| 2010/0229216 | A1* | 9/2010 | Koga | H04W 12/06 726/3 |
| 2012/0130902 | A1* | 5/2012 | Dingler | G06F 21/35 705/71 |
| 2013/0211265 | A1* | 8/2013 | Bedingham | G06F 19/3418 600/483 |

FOREIGN PATENT DOCUMENTS

| | | |
|---|---|---|
| JP | 2007-43644 A | 2/2007 |
| JP | 2007-150519 A | 6/2007 |
| JP | 2008-22208 A | 1/2008 |
| JP | 2009-260666 A | 11/2009 |

\* cited by examiner

FIG. 4

WIRELESS LAN AUTHENTICATION INFORMATION TABLE

| SSID | AUTH_POINT |
|---|---|
| AUTHENTICATION METHOD | WPA2-PSK |
| PASSWORD | authp!! |

FIG. 5

PORTABLE TERMINAL INFORMATION TABLE

| No. | PORTABLE TERMINAL MAC ADDRESS | CONNECTION DATE |
|---|---|---|
| 1 | 5C:9A:D7:EF:5F:81 | 02-10-2011 07:10 |
| 2 | 81:AC:C0:9E:72:A0 | 02-10-2011 07:30 |
| 3 | 00:01:02:FF:AB:CD | 02-10-2011 08:34 |

FIG. 16A
WIRELESS LAN INFORMATION MANAGEMENT TABLE

| No. | MEDICAL INSTRUMENT NAME | MAC ADDRESS OF MEDICAL INSTRUMENT | SSID | AUTHENTICATION METHOD | PASS-WORD | UPDATE DATE |
|---|---|---|---|---|---|---|
| 1 | X-RAY IMAGE DIAGNOSTIC DEVICE | 09:08:07:FE:CD:AB | XABCDE | WPA2-PSK | abcd!! | 02-10-2012 00:00 |
| 2 | MAMMOGRAPHY | BC:AA:E7:BB:5F:80 | M00EFGA | WEP | 0a1b2c | 02-10-2012 00:00 |
| 3 | ENDOSCOPE | 22:A6:03:E9:23:A0 | NOKYAA | WPA | gaajqq | 02-10-2012 00:00 |

FIG. 16B
WIRELESS LAN INFORMATION MANAGEMENT TABLE

| No. | MEDICAL INSTRUMENT NAME | MAC ADDRESS OF MEDICAL INSTRUMENT | SSID | AUTHENTICATION METHOD | PASS-WORD | UPDATE DATE |
|---|---|---|---|---|---|---|
| 1 | X-RAY IMAGE DIAGNOSTIC DEVICE | 09:08:07:FE:CD:AB | XXVFGD | WPA2-PSK | ef!gh | 02-11-2012 00:00 |
| 2 | MAMMOGRAPHY | BC:AA:E7:BB:5F:80 | M99AJA | WEP | 9z8y7x | 02-11-2012 00:00 |
| 3 | ENDOSCOPE | 22:A6:03:E9:23:A0 | NBBPOS | WPA | ho@gja! | 02-11-2012 00:00 |

FIG. 25A

WIRELESS LAN AUTHENTICATION
INFORMATION TABLE

| SSID | XABCDE |
|---|---|
| AUTHENTICATION METHOD | WPA2-PSK |
| PASSWORD | abcd!! |

FIG. 25B

WIRELESS LAN AUTHENTICATION
INFORMATION TABLE

| SSID | XXVFGD |
|---|---|
| AUTHENTICATION METHOD | WPA2-PSK |
| PASSWORD | ef!!gh |

OPERATION MANAGEMENT SYSTEM, CONTROL SYSTEM AND OPERATION CONTROL METHOD

BACKGROUND OF THE INVENTION

1. Field of the Invention

The present invention relates to an operation management system, a control system, and an operation control method.

2. Description of the Related Art

A system is being proposed, in which medical instruments, such as an X-ray imaging system, are operated by a portable terminal, such as a smartphone, through a wireless LAN. When the portable terminal is connected to the wireless LAN, there is a demand to safely and easily perform authentication. In general, since user authentication is performed using an ID and a password, it is necessary for the user to input the ID and the password each time the portable terminal is connected to the wireless LAN, and the user feels considerable inconvenience. In the wireless LAN, only a single password can be set at a certain access point. Accordingly, in a case where plural users use the access point, the single password is used by the plural users. If the single password is used by plural users, confidentiality of the password is degraded, causing degradation in security.

JP2008-22208A discloses a method in which user identification information and information for identifying a user's location are transmitted from a mobile phone to a providing server for authentication, and authentication information of an access point is notified on the basis of the result of the authentication. JP2009-260666A discloses a method in which wireless LAN connection setting is performed using NFC (Near Field Communication), and fee payment processing of a network connection service to which an electronic money technique using NFC is applied is performed.

JP2007-150519A discloses a method of preventing unauthorized wireless LAN connection. JP2003-259417A discloses a method which prevents communication between access points and a wireless terminal from being interrupted by authentication at the time of handover of the wireless terminal between the access points.

According to JP2008-22208A, a lot of time is spent because the user should transmit the user identification information using the mobile phone. According to JP2009-260666A, JP2007-150519A, and JP2003-259417A, burden imposed on the user in authentication is not reduced.

SUMMARY OF THE INVENTION

An object of the invention is to more easily enable authentication of operation when a control system is operated using an operation portable terminal device.

In order to attain the above-described object, an aspect of the invention provides an operation management system including an authentication system, and a control system which is operated by an operation portable terminal device.

The authentication system includes a first terminal identification information reception unit that receives terminal identification information transmitted from the operation portable terminal device as the operation portable terminal device enters an authentication zone, the terminal information being uniquely set for the operation portable terminal device. The entering the authentication zone may include a case where the operation portable terminal device has passed through an authentication gate or a case where the operation portable terminal device enters an authentication room. The authentication zone may be various types of space, and may not be limited to a space, such as an indoor area, which is partitioned by walls or the like. The authentication system further includes a terminal identification information transmission unit which transmits the terminal identification information received by the first terminal identification information reception unit to the control system.

The control system includes a second terminal identification information reception unit that receives the terminal identification information transmitted from the terminal identification information transmission unit of the authentication system, a first terminal identification information storage unit that stores the terminal identification information received by the second terminal identification information reception unit for a predetermined period, a third terminal identification information reception unit that receives the terminal identification information transmitted from the operation portable terminal device, the terminal identification information being uniquely set for the operation portable terminal device, and a permission unit that permits operation of the control system by the operation portable terminal device as the terminal identification information received by the third terminal identification information reception unit is stored in the first terminal identification information storage unit.

The authentication system and the control system constituting the operation management system may be respectively constituted alone.

Another aspect of the invention provides an operation control method for a control system. Specifically, the operation control method includes causing a first terminal identification information reception unit to receive terminal identification information from an authentication system, which terminal identification information is transmitted from an operation portable terminal device to the authentication system from as the operation portable terminal device enters an authentication zone, the terminal identification information being uniquely set for the operation portable terminal device, causing a terminal identification information storage unit to store the terminal identification information received by the first terminal identification information reception unit for a predetermined period, causing a second terminal identification information reception unit to receive the terminal identification information transmitted from the operation portable terminal device, the terminal identification information being uniquely set for the operation portable terminal device, and causing a permission unit to permit operation of the control system by the operation portable terminal device as the terminal identification information received by the second terminal identification information reception unit is stored in the terminal identification information storage unit.

According to the above aspects, when the operation portable terminal device enters the authentication zone, the terminal identification information uniquely set for the operation portable terminal device transmitted from the operation portable terminal device is received in the authentication system. The received terminal identification information is transmitted from the authentication system to the control system. In the control system, when the terminal identification information transmitted from the authentication system is received, the terminal identification information is stored in the first terminal identification information storage unit for the predetermined period. When a connection request to the control system is sent from the operation portable terminal device, the terminal identification information transmitted from the operation portable terminal device is received in the control system. If the received terminal identification information is stored in the first terminal identification information storage unit, it is considered that the operation portable terminal device which transmits the terminal identification information enters the authentication zone. Since it is considered that the user who is able to enter the authentication zone with the operation portable terminal device has authorization to operate the control system, the user is able to operate the control system using the operation portable terminal device. Thus, the authentication of the control system is performed just by entering the authentication zone with the operation portable terminal device.

The authentication system may further include a second terminal identification information storage unit that stores the terminal identification information received by the first terminal identification information reception unit, and a specific command transmission unit that transmits a specific command for specifying the terminal identification information which is stored for longer than a predetermined period since the terminal identification information is stored from among the terminal identification information stored in the second terminal identification information storage unit to the authentication system.

The control system may further include a specific command reception unit that receives the specific command transmitted from the specific command transmission unit of the authentication system, and a first erasure unit that erases terminal identification information to be specified by the specific command received by the specific command reception unit from among the terminal identification information stored in the first terminal identification information storage unit.

The control system may further include an erasure completion data transmission unit that transmits erasure completion data to the authentication system as the terminal identification information is erased by the first erasure unit, and the authentication system may further include an erasure completion data reception unit that receives the erasure completion data transmitted from the erasure completion data transmission unit of the control system, and a second erasure unit that erases the terminal identification information specified by the specific command from the second terminal identification information storage unit as the erasure completion data is received by the erasure completion data reception unit.

The authentication system may further include an authentication unit that performs authentication processing as the operation portable terminal device enters the authentication zone. In this case, for example, the first terminal identification information transmission unit of the authentication system may transmit the terminal identification information to the control system as being authenticated by the authentication unit.

For example, the first terminal identification information reception unit of the authentication system and the third terminal identification information reception unit of the control system may receive the terminal identification information transmitted from the operation portable terminal device through the wireless LAN.

The control system may further include a first wireless LAN information storage unit that stores wireless LAN information for communicating with the operation portable terminal device through the wireless LAN, and the authentication system may further include a second wireless LAN information storage unit that stores the wireless LAN information stored in the first wireless LAN information storage unit of the control system, and a wireless LAN information transmission unit which transmits the wireless LAN information stored in the second wireless LAN information storage unit to the operation portable terminal device as the operation portable terminal device enters the authentication zone.

The control system may further include a first update unit that updates the wireless LAN information stored in the first wireless LAN information storage unit of the control system every predetermined period, and the authentication system may further include a second update unit that updates the wireless LAN information stored in the second wireless LAN information storage unit of the authentication system every predetermined period.

The authentication system may further include an updated content transmission unit that transmits an update content to the control system as the wireless LAN information stored in the second wireless LAN information storage unit is updated by the second update unit. In this case, the control system may further include an updated content reception unit that receives the updated content transmitted from the updated content transmission unit of the authentication system, and for example, the first update unit of the control system may update the first wireless LAN information storage unit to the updated content received by the updated content reception unit.

For example, the operation portable terminal device may include a wireless LAN information reception unit that receives the wireless LAN information transmitted from the wireless LAN information transmission unit of the authentication system, and a wireless LAN information setting unit that sets, in the operation portable terminal device, the wireless LAN information received by the wireless LAN information reception unit.

BRIEF DESCRIPTION OF THE DRAWINGS

FIG. 4 shows an example of a wireless LAN authentication information table.

FIG. 5 shows an example of a portable terminal information table.

FIGS. 16A and 16B show an example of a wireless LAN information management table.

FIGS. 25A and 25B show an example of a wireless LAN authentication table.

DESCRIPTION OF THE PREFERRED EMBODIMENTS

Figure 1:
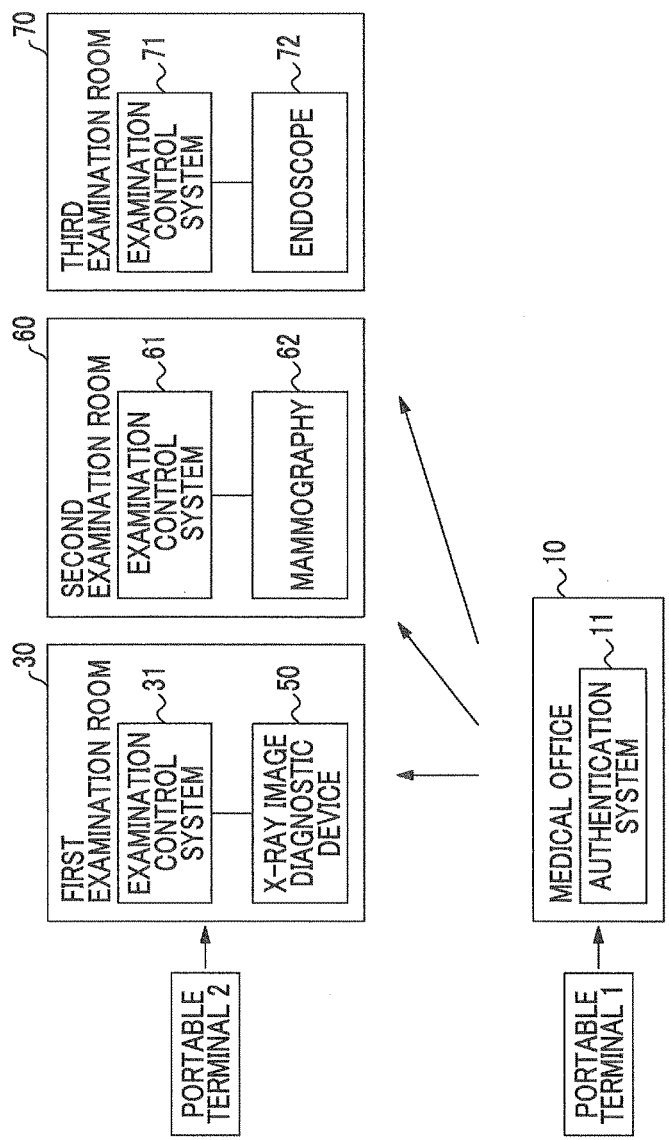
FIG. 1 shows the relationship between a medical office, a first examination room, a second examination room, and a third examination room in a hospital.

FIG. 1 is an overall configuration diagram of an operation management system according to an exemplary embodiment.

In this example, medical instruments, such as an examination device in a hospital, are operated using a portable terminal through a wireless LAN.

An authentication system 11 is arranged in a room of a medical office 10 (authentication room) as an authentication zone where only medical personnel of a hospital is permitted to enter. In the medical office 10, a wireless LAN (Local Area Network) is extended throughout the authentication system 11. When a user with a portable terminal (operation portable terminal device) enters the medical office 10, authentication is performed, and thereby the portable terminal and the authentication system 11 become able to perform communication with each other using the wireless LAN. A connection method to the authentication system 11 may include authentication processing such as WEP or WAP, or since only medical personnel can enter the medical office 10, authentication may not be required.

In the hospital, a first examination room 30, a second examination room 60, a third examination room 70, and the like are provided. The first examination room 30 is an X-ray image diagnostic room. In the first examination room 30, an X-ray image diagnostic device 50 and an examination control system 31 (control system) which controls the X-ray image diagnostic device 50 are arranged. The second examination room 60 is a mammography examination room. In the second examination room 60, a mammography 62 and an examination control system 61 which controls the mammography 62 are arranged. The third examination room 70 is an endoscopic examination room. In the third examination room 70, an endoscope 72 and an examination control system 71 which controls the endoscope 72 are arranged.

In the first examination room 30, the second examination room 60, and the third examination room 70, a wireless LAN is extended throughout the examination control systems 31, 61, and 71. When the user with the portable terminal enters the first examination room 30, the second examination room 60, or the third examination room 70, the portable terminal and the examination control system 31, 61, or 71 can perform communication with each other through the wireless LAN.

In this example, a portable terminal which is authenticated in the authentication system 11 of the medical office 10 is able to operate the examination control systems 31, 61, and 71 without authentication in all of the first examination room 30, the second examination room 60, and the third examination room 70. In contrast, a portable terminal which is not authenticated in the authentication system 11 of the medical office 10 is not able to operate the examination control systems 31, 61, and 71 of the first examination room 30, the second examination room 60, and the third examination room 70. For example, when a user with a portable terminal 1 enters the medical office 10, the portable terminal 1 is authenticated. If the user enters the first examination room 30, the second examination room 60, or the third examination room 70 carrying the portable terminal 1 authenticated in the medical office 10, the user is able to operate the examination control system 31, 61, or 71 using the portable terminal 1. Accordingly, the user is able to operate the X-ray image diagnostic device 50, the mammography 62, and the endoscope 72 using the portable terminal 1. In a case where a user with a portable terminal 2 enters the first examination room 30, the second examination room 60, or the third examination room 70 without entering the medical office 10, the user cannot operate the examination control system 31, 61, or 71 using the portable terminal 2.

In this way, in this example, just by entering the medical office 10 with the portable terminal, the user can operate the examination control system 31 of the first examination room 30, the examination control system 61 of the second examination room 60, and the examination control system 71 of the third examination room 70 using the portable terminal. If a user does not enter the medical office with a portable terminal, the user cannot operate the examination control system 31 of the first examination room 30, the examination control system 61 of the second examination room 60, and the examination control system 71 of the third examination room 70 using the portable terminal. Specifically, this will become apparent from the following description. With a combination with admission management, card authentication when entering and exiting from the medical office 10, or the like, it may be possible to physically improve authentication strength.

Figure 2:
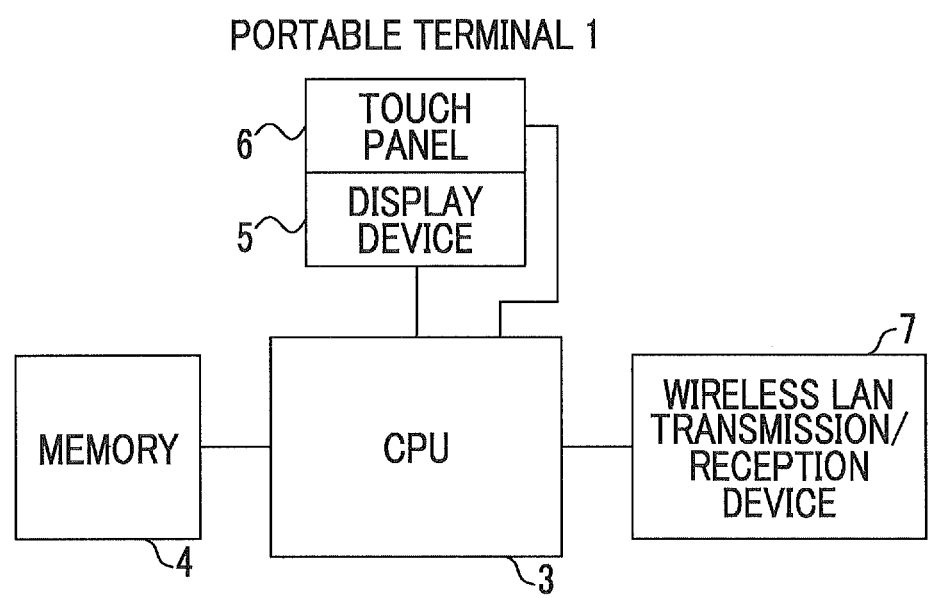
FIG. 2 is a block diagram showing the electrical configuration of a portable terminal.

FIG. 2 is a block diagram showing the electrical configuration of the portable terminal 1. The portable terminal 2 has the same electrical configuration.

The overall operation of the portable terminal 1 is controlled by a CPU 3.

The portable terminal 1 includes a memory 4 which stores predetermined data, a display device 5, a touch panel 6 which is formed on the display screen of the display device 5, and a wireless LAN transmission/reception device 7 for communication using the wireless LAN. A desired command, such as an operation, is input from the touch panel 6 to the portable terminal 1. As means for receiving a desired input, instead of the touch panel 6, for example, buttons, switches, or the like provided in the portable terminal 1 may be used.

Figure 3:
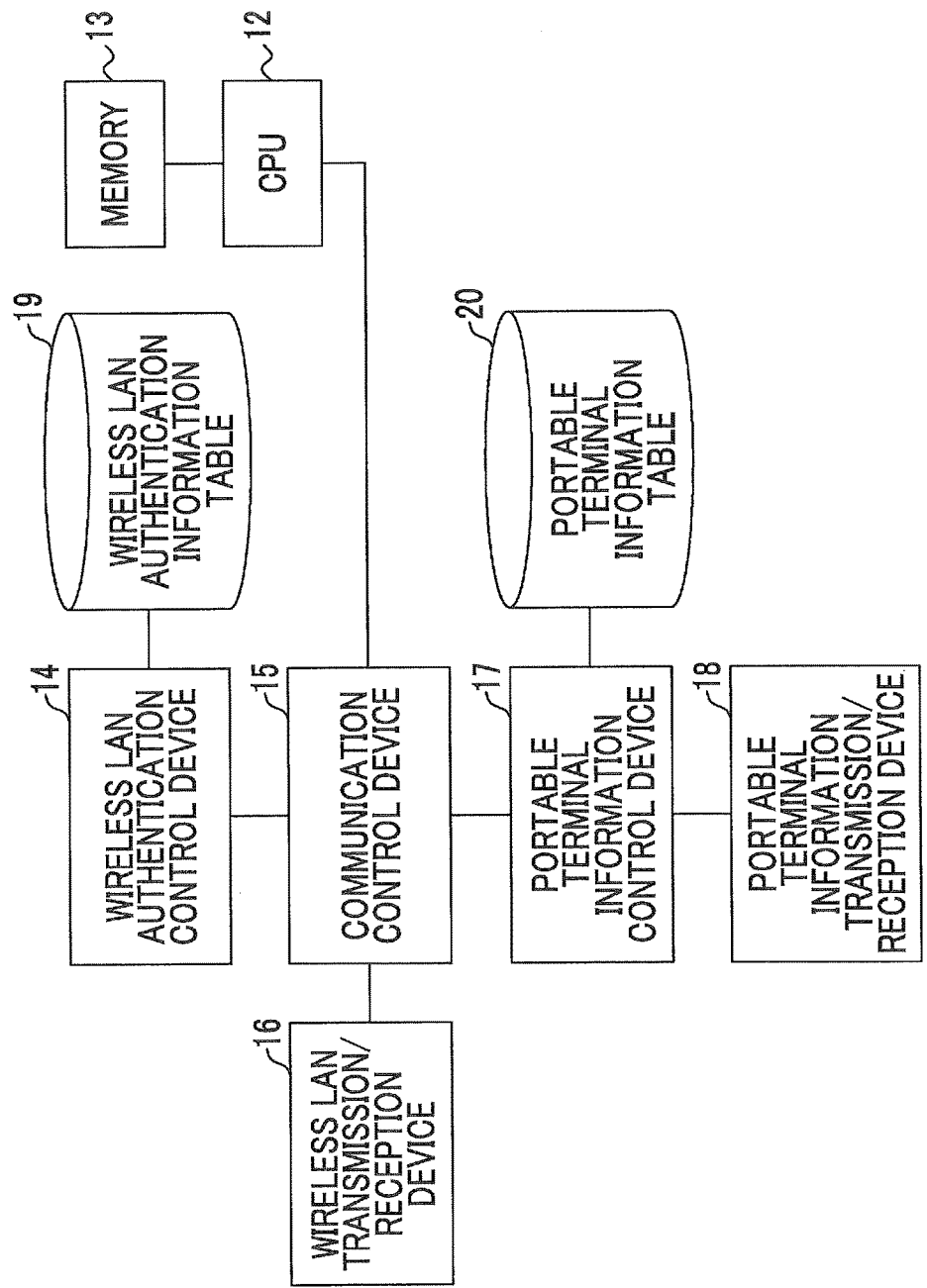
FIG. 3 is a block diagram showing the electrical configuration of an authentication system.

FIG. 3 is a block diagram showing the electrical configuration of the authentication system 11.

The overall operation of the authentication system 11 is controlled by a CPU 12.

The authentication system 11 includes a memory 13 which stores predetermined data, a wireless LAN authentication control device 14, a communication control device 15, a wireless LAN transmission/reception device 16, a portable terminal information control device 17, and a portable terminal information transmission/reception device 18. The authentication system 11 also includes databases 19 and 20 which respectively store a wireless LAN authentication information table and a portable terminal information table. The databases 19 and 20 may be constituted by a common hard disk.

FIG. 4 shows an example of the wireless LAN authentication information table which is stored in the database 19.

The wireless LAN authentication information table stores an SSID (Service Set Identifier) of a wireless LAN which is used in the authentication system 11, an authentication method, and a password. Wireless LAN authentication of a portable terminal which is carried by a user who enters the medical office 10 is performed using wireless LAN authentication information stored in the wireless LAN authentication information table.

FIG. 5 shows an example of the portable terminal information table which is stored in the database 20.

In the portable terminal information table, a MAC (Media Access Control) address (terminal identification information) of a portable terminal authenticated in the authentication system 11 is stored in association with a connection date (authentication date and time). A portable terminal which has a MAC address stored in the portable terminal information table can control the examination control system 31, 60, or 71 of the first examination room 30, the second examination room 60, or the third examination room 70 as described above.

Figure 6:
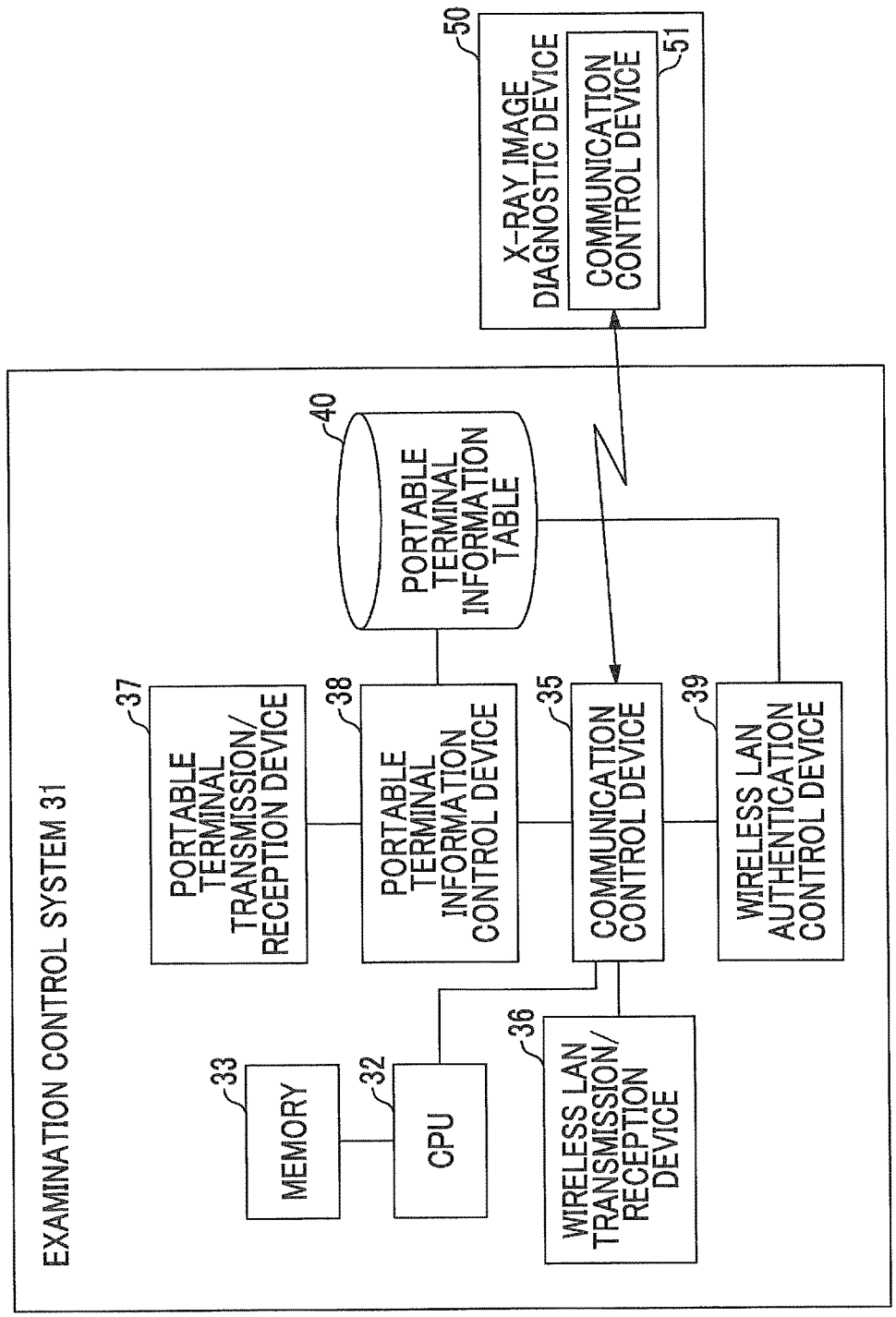
FIG. 6 is a block diagram showing the electrical configuration of an examination control system.

FIG. 6 is a block diagram showing the electrical configuration of the examination control system 31 which is arranged in the first examination room 30. The examination control system 61 or 71 which is arranged in the second examination room 60 or the third examination room 70 has the same configuration.

The overall operation of the examination control system 31 is controlled by a CPU 32.

The examination control system 31 includes a memory 33 which stores predetermined data, a communication control device 35, a wireless LAN transmission/reception device 36 (third terminal identification information reception unit), a portable terminal information transmission/reception device 37 (second terminal identification information reception unit), a portable terminal information control device 38, and a wireless LAN authentication control device 39 (permission unit). The examination control system 31 also includes a database 40 (first terminal identification information storage unit) which stores the same portable terminal information table as the portable terminal information table stored in the authentication system 11.

FIG. 6 also shows the X-ray image diagnostic device 50 which is controlled by the examination control system 31.

The X-ray image diagnostic device 50 includes a communication control device 51. The communication control device 35 included in the examination control system 31 and the communication control device 51 included in the X-ray image diagnostic device 50 perform communication with each other, and the X-ray image diagnostic device 50 is controlled by the examination control system 31.

Hereinafter, processing until the user with the portable terminal 1 enters the medical office 10 and then enters the first examination room 30 to be able to operate the examination control system 31 using the portable terminal 1 will be described. Similarly, the user enters the second examination room 60 or the third examination room 70 to be able to operate the examination control system 61 or 71.

Figure 7:
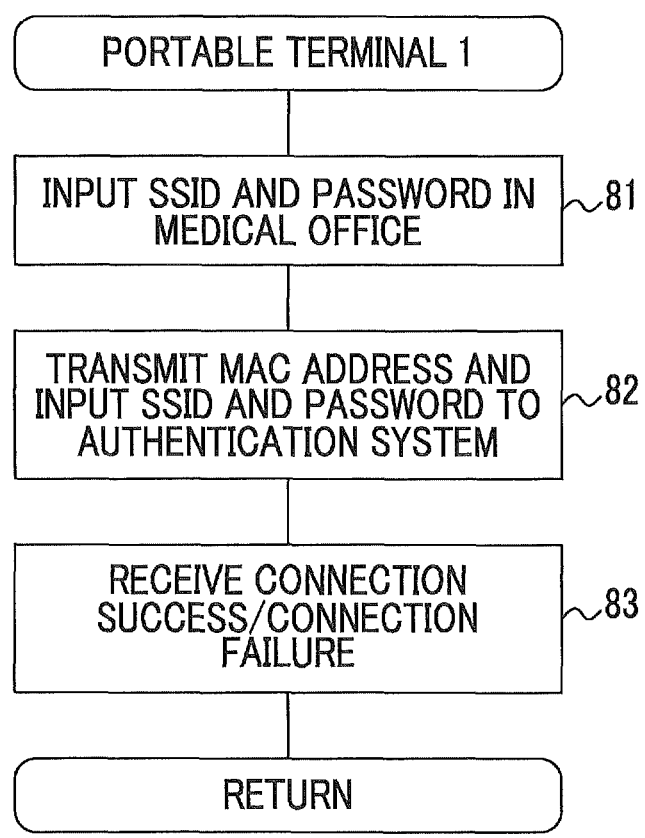
FIG. 7 is a flowchart showing a processing procedure of a portable terminal.
Figure 8:
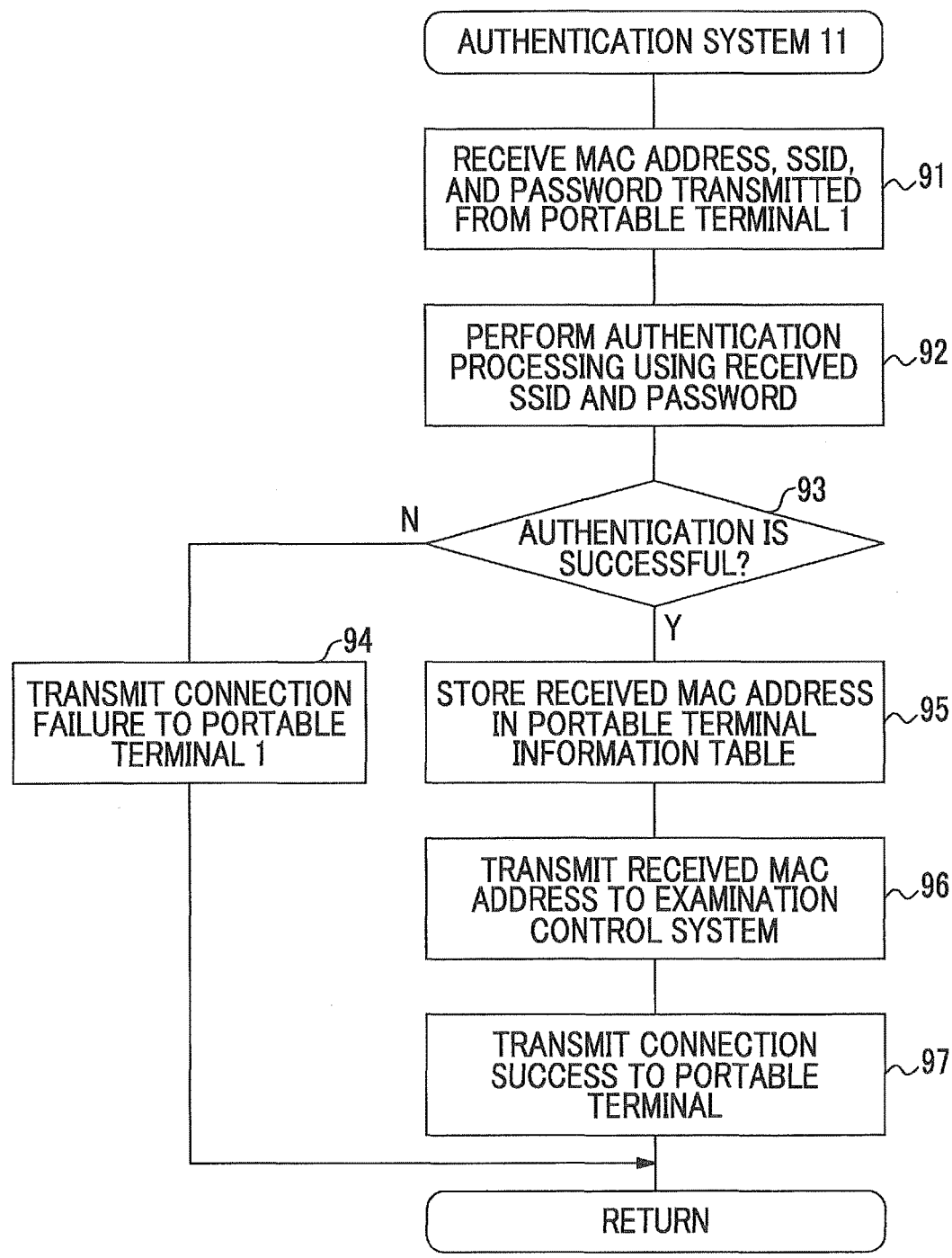
FIG. 8 is a flowchart showing a processing procedure of an authentication system.
Figure 9:
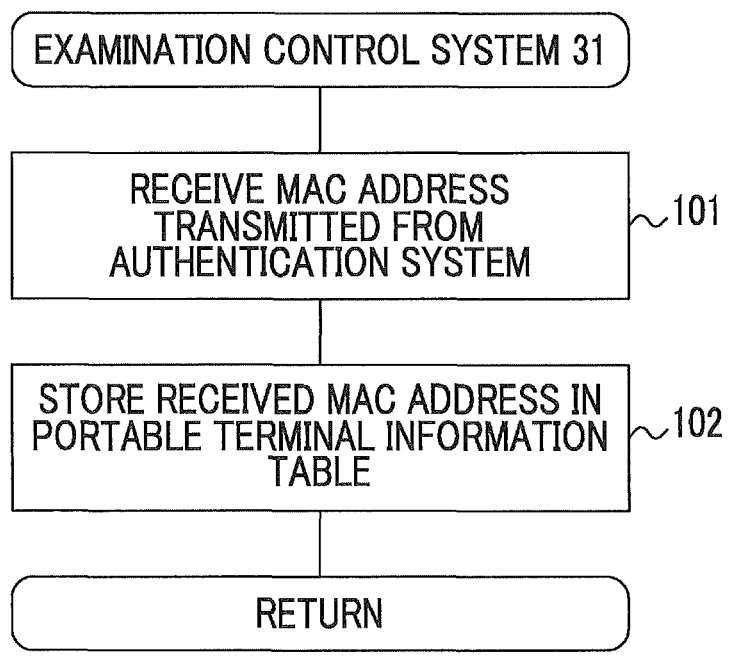
FIG. 9 is a flowchart showing a processing procedure of an examination control system.

FIGS. 7 to 9 show a processing procedure in which a MAC address is stored in the portable terminal information table. FIG. 7 is a flowchart showing a processing procedure of the portable terminal 1, FIG. 8 is a flowchart showing a processing procedure of the authentication system, and FIG. 9 is a flowchart showing a processing procedure of the examination control system.

When the user with the portable terminal 1 enters the medical office 10, the SSID and the password are input to the portable terminal 1 in the medical office 10 (Step 81 of FIG. 7). The user already knows the SSID and the password which are used in the wireless LAN in the medical office 10. Then, a MAC address which is given to the portable terminal 1 is read from the memory 4, the read MAC address and the SSID and the password input to the portable terminal 1 are transmitted to the authentication system 11 by the wireless LAN transmission/reception device 7 (Step 82 of FIG. 7).

The MAC address, the SSID, and the password transmitted from the portable terminal 1 are received by the wireless LAN transmission/reception device 16 (first terminal identification information reception unit) of the authentication system 11 (Step 91 of FIG. 8). The wireless LAN authentication information table stored in the database 19 is read by the wireless LAN authentication control device 14. Authentication processing for determining whether or not the SSID and password which are stored in the read wireless LAN authentication information table are identical to the received SSID and password is performed by the wireless LAN authentication control device 14 (authentication unit) (Step 92 of FIG. 8).

If one of the SSID and the password is not identical, it is determined to be authentication failure (NO in Step 93 of FIG. 8), and data representing connection failure is transmitted from the authentication system 11 to the portable terminal 1 (Step 94 of FIG. 8).

If the SSID and the password are identical, the authentication is successful. If authentication is successful (YES in Step 93 of FIG. 8), the received MAC address of the portable terminal 1 is stored in the portable terminal information table stored in database 20 serving as a second terminal identification information storage unit by the portable terminal information control device 17 (Step 95 of FIG. 8). The date and time on which the MAC address is stored in the portable terminal information table is stored in the portable terminal information table as connection date. A timepiece (not shown) is provided in the authentication system 11, and the date and time read from the timepiece is stored in the portable terminal information table. The received MAC address is transmitted from the portable terminal information transmission/reception device 18 (terminal identification information transmission unit) to all of the examination control systems 31, 61, and 71 (Step 96 of FIG. 8). Data representing connection (authentication) success is transmitted from the wireless LAN transmission/reception device 16 of the authentication system 11 to the portable terminal 1 (Step 97 of FIG. 8).

Data representing connection success or connection failure transmitted from the authentication system 11 is received in the portable terminal 1 (Step 83 of FIG. 7). A character string or the like of connection success or connection failure is displayed on the display screen of the display device 5 of the portable terminal 1. In the case of connection failure, reconnection may be performed as necessary.

Referring to FIG. 9, the MAC address transmitted from the authentication system 11 is received by the portable terminal information transmission/reception device 37 (second terminal identification information reception unit) of the examination control system 31 (Step 101). The received MAC address is stored in the portable terminal information table which is stored in the database 40 serving as a first terminal identification information storage unit by the portable terminal information control device 38 (Step 102). The MAC address is received in the same manner in each of the examination control systems 61 and 71 other than the examination control system 31, and is stored in the portable terminal information table which is stored in each of the examination control systems 61 and 71. Accordingly, the portable terminal information table which is stored in the authentication system 11 is identical to the portable terminal information table which is stored in each of the examination control systems 31, 61, and 71.

In the above-described example, the authentication processing of the portable terminal 1 is performed in the authentication system 11. Alternatively, since it is considered that a person who can enter the medical office 10 is limited to medical personnel who can enter the first examination room 30, the second examination room 60, and the third examination room 70, it is considered that, if a person with the portable terminal 1 enters the medical office, the authentication of the portable terminal 1 is performed. In this case, the authentication processing of the portable terminal 1 in the authentication system 11 may not be required.

A gate may be provided at the entrance or the like of the medical office 10, and when a person with the portable terminal 1 passes through the gate, as described above, the MAC address of the portable terminal 1 may be transmitted to the authentication system 11, the examination control system 31, and the like.

Figure 10:
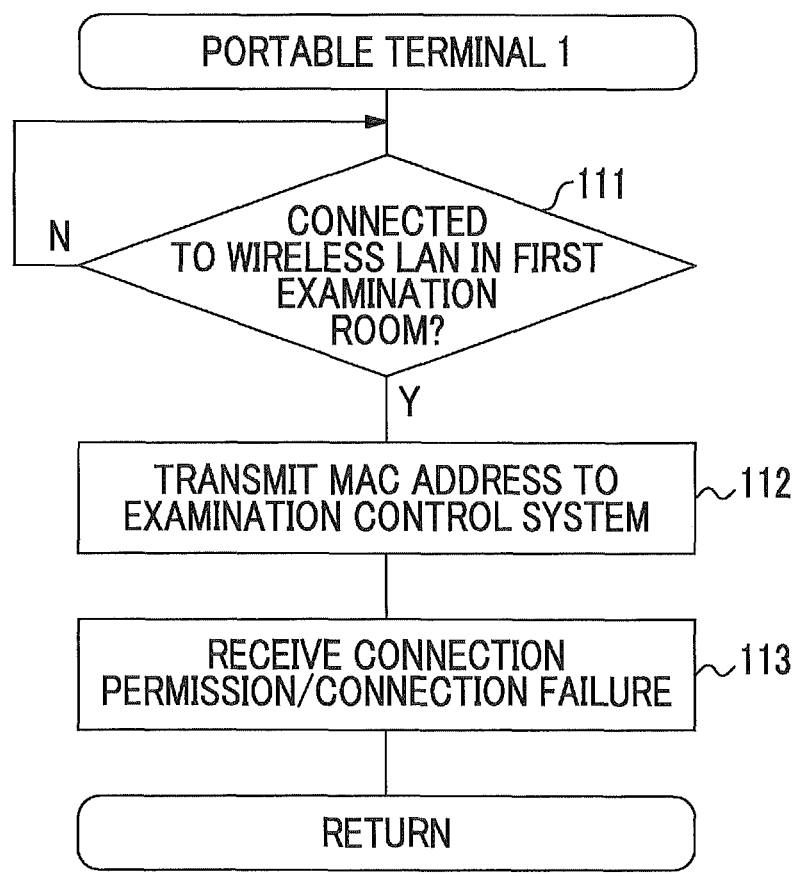
FIG. 10 is a flowchart showing a processing procedure of a portable terminal.
Figure 11:
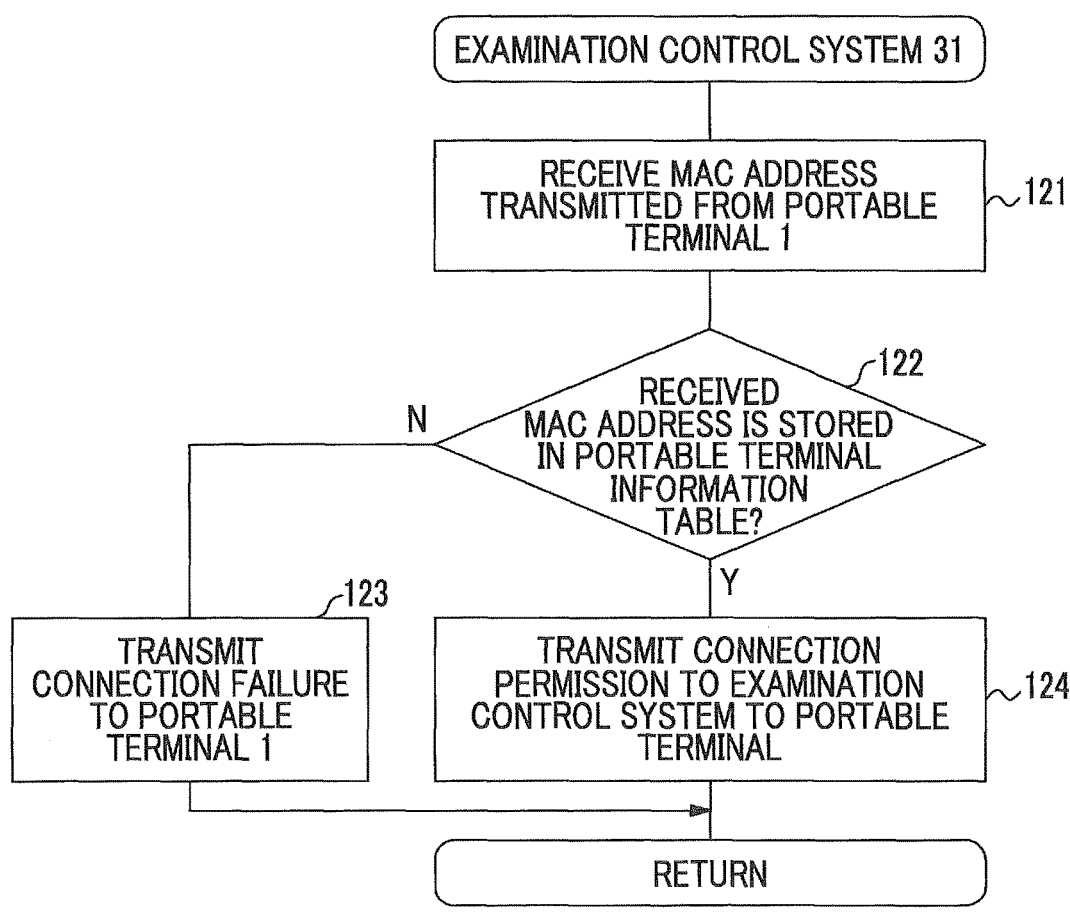
FIG. 11 is a flowchart showing a processing procedure of an examination control system.

FIGS. 10 and 11 are flowcharts showing a processing procedure when the user with the portable terminal 1 authenticated as described above enters the first examination room 30. The same applies to a case where the user enters the second examination room 60 or the third examination room 70. FIG. 10 is a flowchart showing a processing procedure of the portable terminal 1, and FIG. 11 is a flowchart showing a processing procedure of the examination control system 31.

Authentication using the SSID and the password as described above for connection to the wireless LAN of the first examination room 30, the second examination room 60, and the third examination room 70 is not required. If the user with the portable terminal 1 enters the examination room 30, 60, or 70 within a communication range, communication with the wireless LAN can be performed.

When the user with the portable terminal 1 authenticated in the authentication system 11 enters the first examination room 30, the portable terminal 1 is connected to the wireless LAN of the examination control system 31 which is arranged in the first examination room 30 (Step 111 of FIG. 10). When this happens, the MAC address of the portable terminal 1 is transmitted from the portable terminal 1 to the examination control system 31 (Step 112 of FIG. 10).

The MAC address transmitted from the portable terminal 1 is received by the wireless LAN transmission/reception device 36 (third terminal identification information reception unit) of the examination control system 31 (Step 121 of FIG. 11). It is confirmed by the wireless LAN authentication control device 39 (permission unit) whether or not the MAC address received by the wireless LAN transmission/reception device 36 is stored in the portable terminal information table which is stored in the database 40 of the examination control system 31 (Step 122 of FIG. 11).

If the received MAC address is not stored in the portable terminal information table of the examination control system 31 (NO in Step 122 of FIG. 11), it is confirmed that the portable terminal 1 having the MAC address does not obtain authentication in the authentication system 11. In order to prevent the examination control system 31 from being operated using the portable terminal 1, wireless LAN communication between the portable terminal 1 and the examination control system 31 is disconnected. Data representing connection failure is transmitted from the wireless LAN transmission/reception device 36 of the examination control system 31 to the portable terminal 1 (Step 123 of FIG. 11).

If the received MAC address is stored in the portable terminal information table of the examination control system 31 (YES in Step 122 of FIG. 11), it is confirmed that the portable terminal 1 having the received MAC address has obtained authentication in the authentication system 11. Since the user with the portable terminal 1 is considered to be a medical personnel who has authentication to enter the first examination room 30, the connection of the portable terminal 1 and the wireless LAN of the examination control system 31 is maintained, and data representing connection permission is transmitted from the wireless LAN transmission/reception device 36 of the examination control system 31 to the portable terminal 1 (Step 124 of FIG. 11). As a result, the user who enters the first examination room 30 with the portable terminal 1 is able to operate the examination control system 31 using the portable terminal 1. Accordingly, the user can operate the X-ray image diagnostic device 50 using the portable terminal 1. Similarly, if the user enters the second examination room 60 or the third examination room 70 with the portable terminal 1 authenticated in the authentication system 11, the user can operate the mammography 62 or the endoscope 72 using the portable terminal 1.

Figure 12:
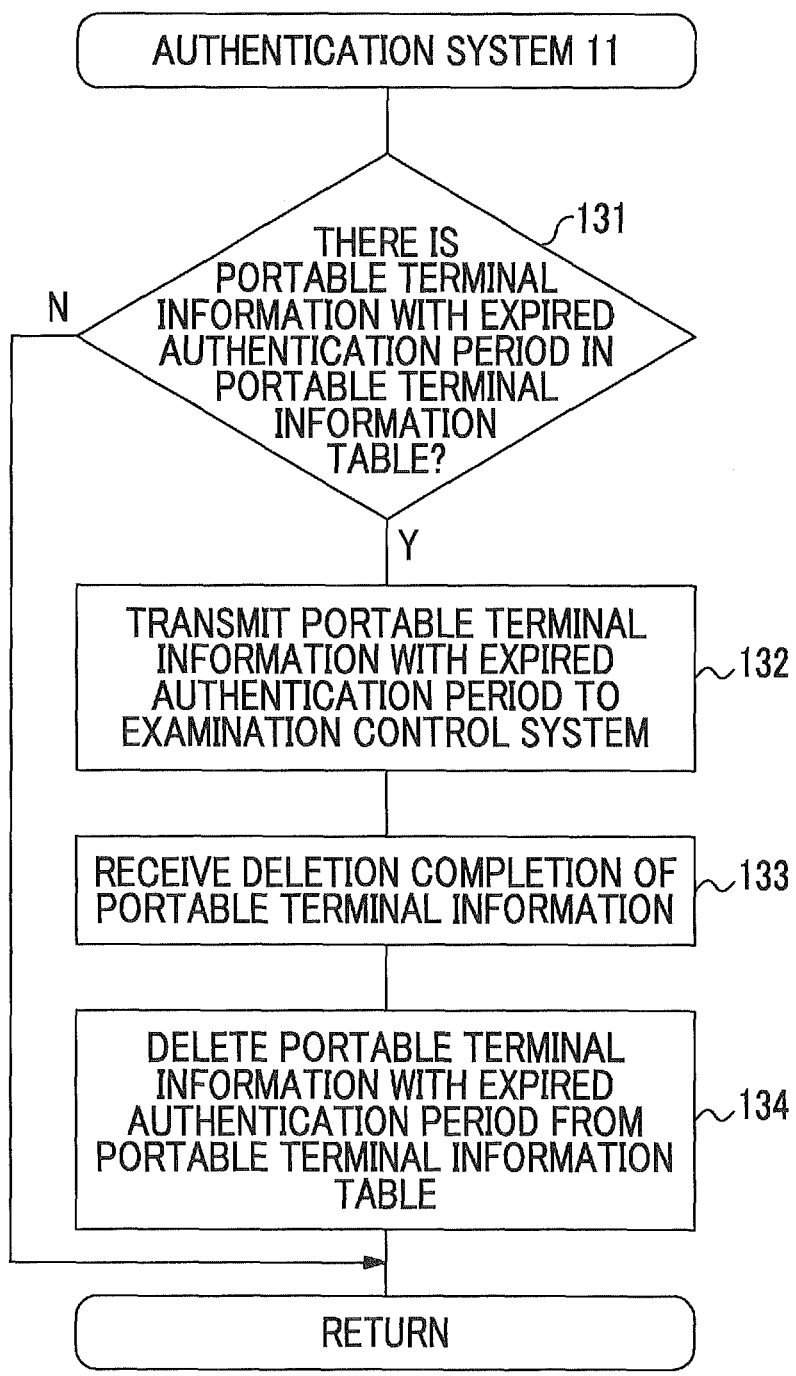
FIG. 12 is a flowchart showing a processing procedure of an authentication system.
Figure 13:
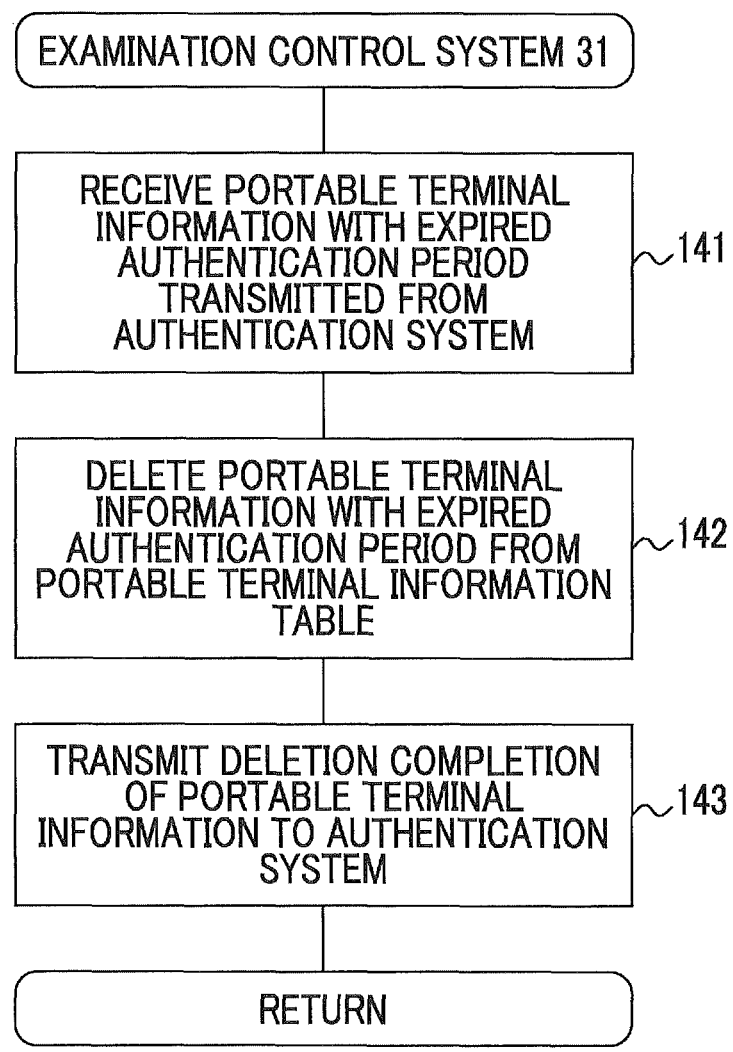
FIG. 13 is a flowchart showing a processing procedure of an examination control system.

FIGS. 12 and 13 show processing for deleting the MAC address of the authenticated portable terminal 1 from the portable terminal information table when a predetermined period has elapsed after the portable terminal 1 is authenticated in the authentication system 11. FIG. 12 is a flowchart showing a processing procedure of the authentication system 11, and FIG. 13 is a flowchart showing a processing procedure of the examination control system 31.

Assuming that the portable terminal 1 which has been authenticated once in the authentication system 11 can thereafter perform communication with the examination control system 31 using the wireless LAN without restrictions, if the user has the portable terminal 1, the user may enter the first examination room 30 to operate the examination control system 31 even after retirement from the hospital. For this reason, in this example, when a predetermined period has elapsed after authentication in the authentication system 11, the MAC address is deleted from the portable terminal information table. Accordingly, in a case where the predetermined period has elapsed after authentication, the examination control system 31 or the like cannot be operated using the authenticated portable terminal 1.

It is confirmed whether or not a MAC address with an expired authentication period is stored for longer than a predetermined period (for example, a day) from a connection date in the portable terminal information table stored in the database 20 of the authentication system 11 (Step 131 of FIG. 12). If a MAC address with the expired authentication period is not stored in the portable terminal information table (NO in Step 131 of FIG. 12), the processing after Step 132 is skipped. If a MAC address with the expired authentication period is stored in the portable terminal information table (YES in Step 131 of FIG. 12), the MAC address with the expired authentication period (specific command) is transmitted from the portable terminal information transmission/reception device 18 (specific command transmission unit) of the authentication system 11 to the examination control systems 31, 61, and 71 (Step 132 of FIG. 12).

The MAC address with the expired authentication period transmitted from the authentication system 11 is received by the portable terminal information transmission/reception device 37 (specific command reception unit) of each of the examination control systems 31, 61, and 71 (Step 141 of FIG. 13). The MAC address is deleted from the portable terminal information table stored in each of the examination control systems 31, 61, and 71 by the portable terminal information control device 38 (first erasure unit) (Step 142 of FIG. 13). When the MAC address with the expired authentication period is deleted from the portable terminal information table, data (erasure completion data), which represents deletion completion, is transmitted from the portable terminal information transmission/reception device 37 (erasure completion data transmission unit) of the examination control system 31 to the authentication system 11 (Step 143 of FIG. 13).

When data representing deletion completion transmitted from the examination control system 31 is received by the portable terminal information transmission/reception device 18 (erasure completion data reception unit) of the authentication system 11 (Step 133 of FIG. 12), the MAC address with the expired authentication period is deleted from the portable terminal information table stored in the authentication system 11 by the portable terminal information control device 17 (second erasure unit) (Step 134 of FIG. 12).

In a case where the predetermined period has elapsed after authentication in the authentication system 11, the MAC address is deleted from the portable terminal information table, and thereby a situation in which the examination control system 31 is operated permanently using the portable terminal after having been authenticated once is prevented. Since the content of the portable terminal information table stored in the authentication system 11 and the content of the portable terminal information table stored in the examination control system 31 or the like become identical, it is possible to prevent a problem in that the MAC address with the expired authentication period remains in the portable terminal information table which is stored in the examination control system 31, and the examination control system 31 or the like can be operated using the portable terminal with the expired authentication period even if the MAC address with the expired authentication period is deleted from the portable terminal information table which is stored in the authentication system 11.

FIGS. 14 to 25 show another example.

Although in the above-described example, the wireless LAN in the first examination room 30 or the like does not perform the authentication processing using the SSID and the password, in this example, the wireless LAN in the first examination room 30 or the like performs the authentication processing using the SSID and the password.

Figure 14:
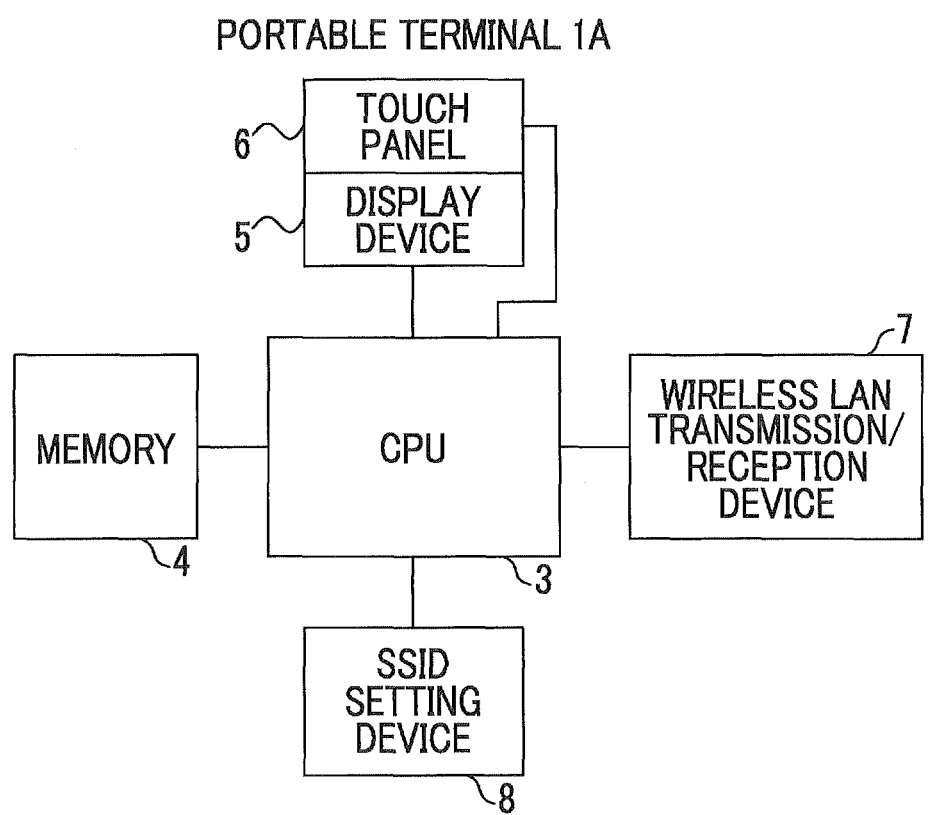
FIG. 14 is a block diagram showing the electrical configuration of a portable terminal.

FIG. 14 is a block diagram showing the electrical configuration of a portable terminal 1A. In this drawing, equivalents to those of the portable terminal 1 shown in FIG. 2 are represented by the same reference numerals, and description thereof will not be repeated.

The portable terminal 1A includes an SSID setting device 8. As described below, the SSID setting device 8 sets the SSID and the password transmitted from the authentication system 11 in the portable terminal 1A. The SSID and the password being set in the portable terminal 1A, the wireless LAN of the examination control system 31 of the first examination room 30 and the portable terminal 1A can perform communication with each other without the user's input of the SSID and the password to the portable terminal 1A.

Figure 15:
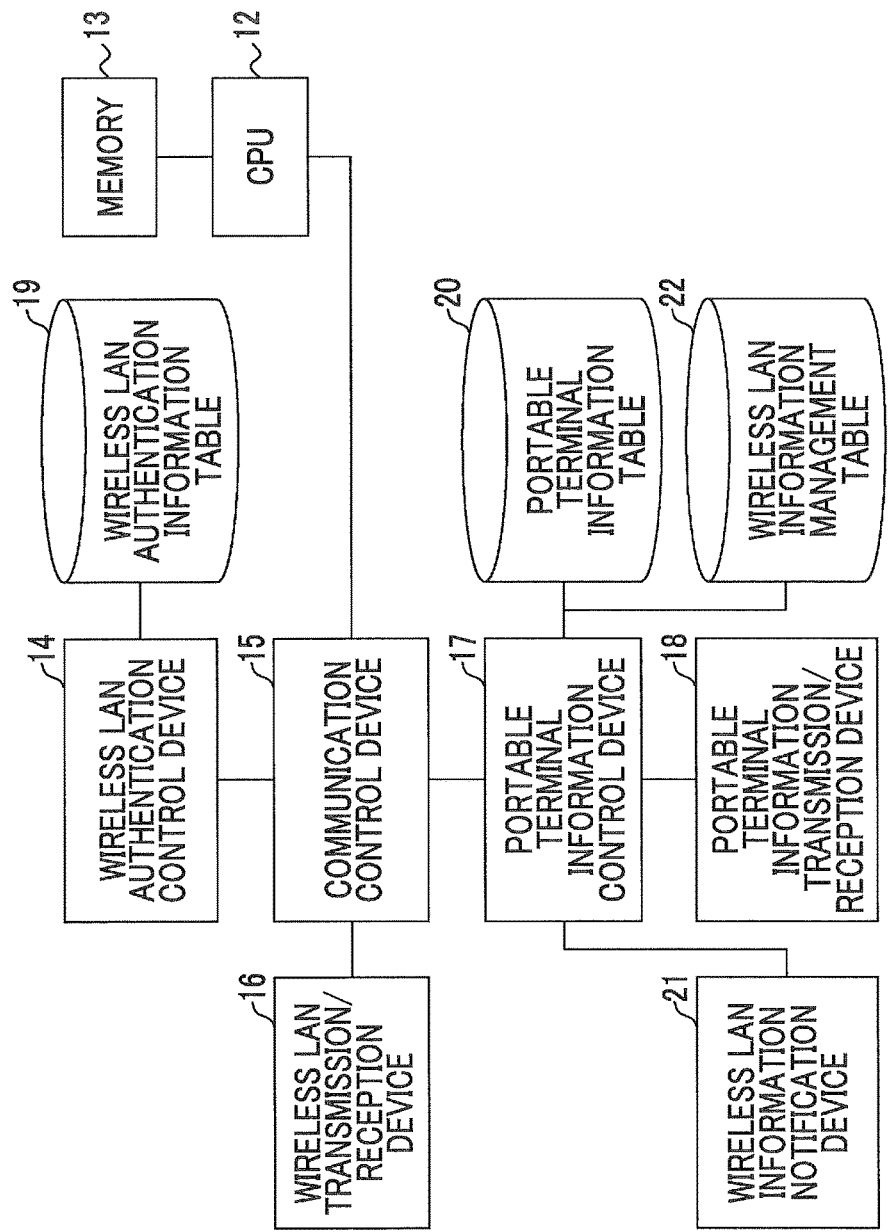
FIG. 15 is a block diagram showing the electrical configuration of an authentication system.

FIG. 15 is a block diagram showing the electrical configuration of the authentication system 11A. In this drawing, equivalents to those shown in FIG. 3 are represented by the same reference numerals, and description thereof will not be repeated.

Similarly to the authentication system 11, the authentication system 11A is arranged in the medical office 10.

The authentication system 11A includes a database 22 (second wireless LAN information storage unit) which stores a wireless LAN information management table, and a wireless LAN information notification device 21. The wireless LAN information management table stores wireless LAN information, such as an SSID and a password for connection to the wireless LAN in the first examination room 30, the second examination room 60, and the third examination room 70. The wireless LAN information notification device 21 transmits the wireless LAN information stored in the wireless LAN information management table to the examination control system 31 or the like arranged in the first examination room 30 or the like.

FIGS. 16A and 16B show an example of a wireless LAN information management table. FIG. 16A shows an example of a wireless LAN information management table before update, and FIG. 16B shows an example of a wireless LAN information management table after update.

Referring to these drawings, the wireless LAN information management table stores the MAC address of a medical instrument, SSID, authentication method, password, and update date corresponding to each of the X-ray image diagnostic device 50, the mammography 62, and the endoscope 72, which are medical instrument arranged in the first examination room 30, the second examination room 60, and the third examination room 70, respectively. With the use of the SSID and the like stored corresponding to a medical instrument, the wireless LAN in the examination room 30, 60, or 70 in which the medical instrument is arranged can be used. The update date represents date and time on which the wireless LAN information stored in the wireless LAN information management table corresponding to the medical instrument is updated. Since authentication to access the wireless LAN is performed using the wireless LAN information, the wireless LAN information is updated every predetermined period, and thereby security is improved.

Figure 17:
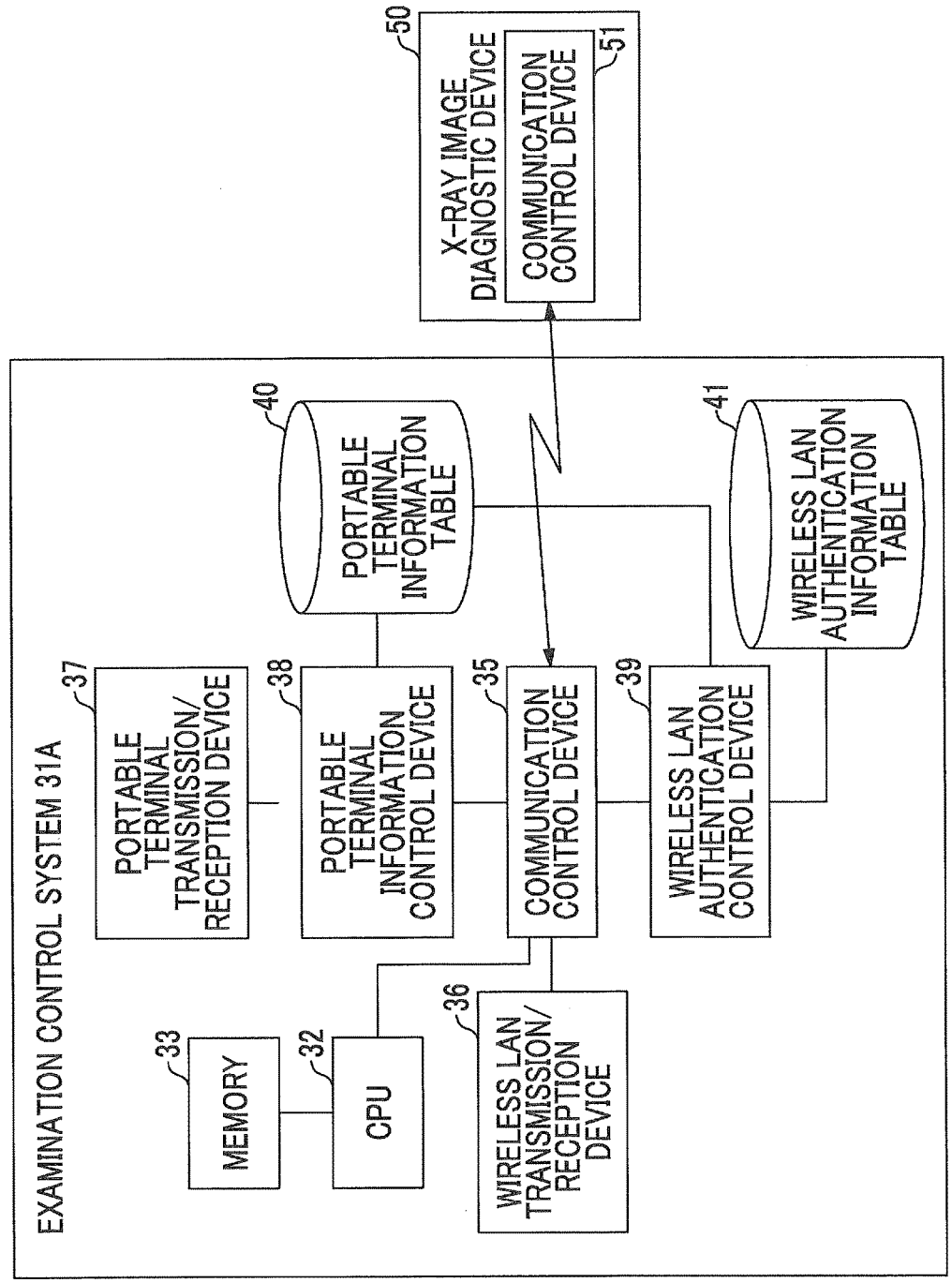
FIG. 17 is a block diagram showing the electrical configuration of a control system.

FIG. 17 is a block diagram showing the electrical configuration of an examination control system 31A. Similarly to the examination control system 31, the examination control system 31A is arranged in the first examination room 30, and the X-ray image diagnostic device 50 is controlled by the examination control system 31A. The examination control systems 61 and 71 may have the same configuration as the examination control system 31A.

The control system 31A includes a database 41 (first wireless LAN information storage unit) which stores a wireless LAN authentication information table (FIGS. 25A and 25B). Since the control system 31A controls the X-ray image diagnostic device 50, a table which stores the MAC address, SSID, authentication method, password, and update date for the X-ray image diagnostic device 50 stored in the wireless LAN information management table serves as the wireless LAN authentication information table of the examination control system 31A.

Figure 18:
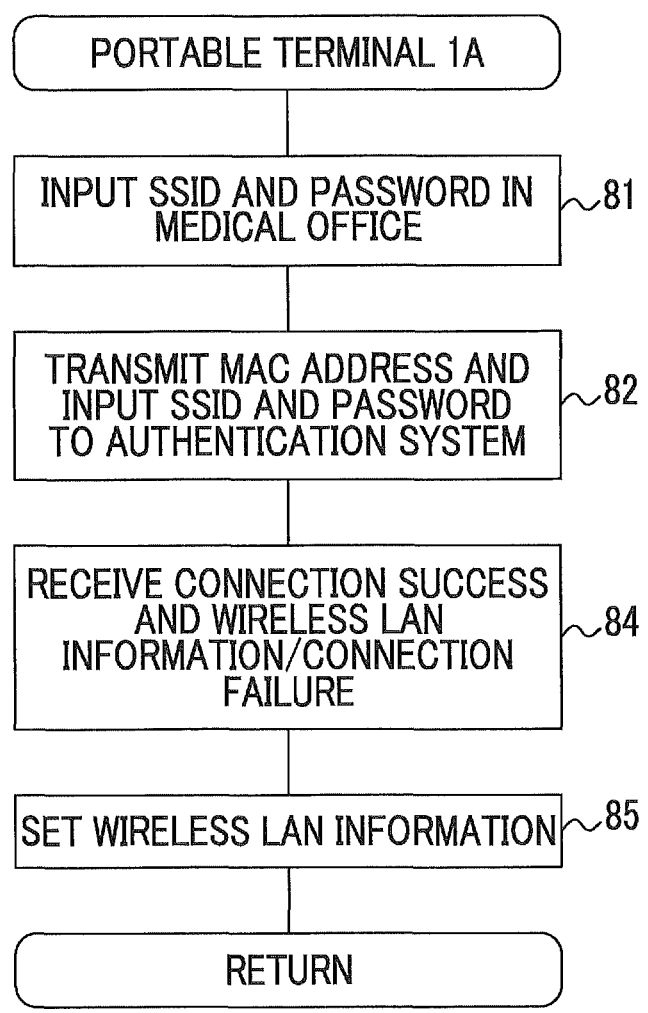
FIG. 18 is a flowchart showing a processing procedure of a portable terminal.
Figure 19:
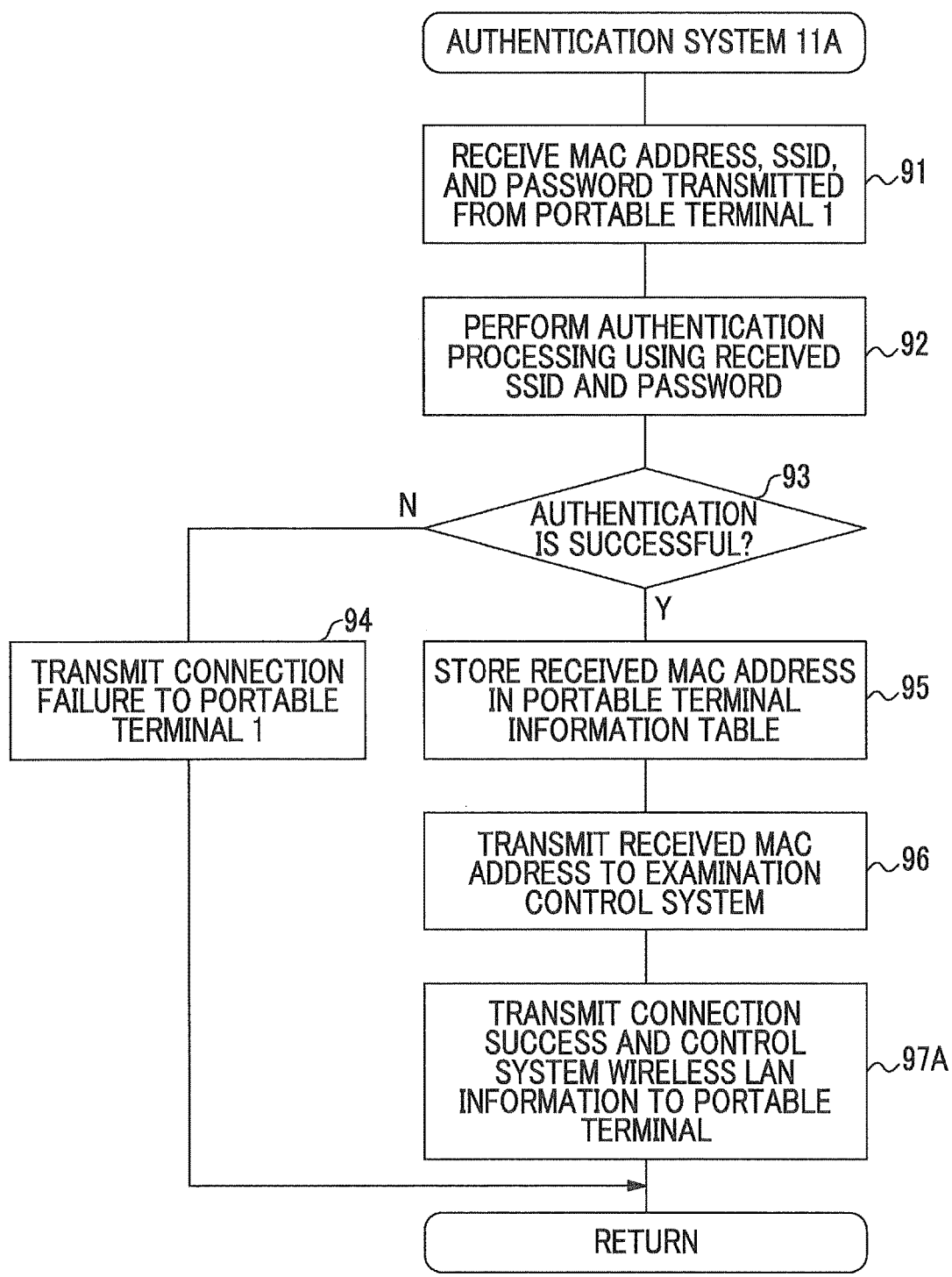
FIG. 19 is a flowchart showing a processing procedure of an authentication system.

FIGS. 18 and 19 show a processing procedure in which a MAC address is registered in a portable terminal information table and a processing procedure in which wireless LAN information is set in the portable terminal 1A. FIG. 18 is a flowchart corresponding to FIG. 7 and showing a processing procedure of the portable terminal 1A. In FIG. 18, the same steps as the steps shown in FIG. 7 are represented by the same reference numerals, and description thereof will not be repeated. FIG. 19 is a flowchart corresponding to FIG. 8 and showing a processing procedure of the authentication system 11A. In FIG. 19, the same steps as the steps shown in FIG. 8 are represented by the same reference numerals, and description thereof will not be repeated.

As described above, the MAC address, SSID, and password of the portable terminal 1A are transmitted from the portable terminal 1A to the authentication system 11A in the medical office 10 (Steps 81 and 82 of FIG. 18), and are received in the authentication system 11A (Step 91 of FIG. 19). When the portable terminal 1A is authenticated in the authentication system 11A (YES in Steps 92 and 93 of FIG. 19), as described above, the MAC address of the authenticated portable terminal 1A is stored in the portable terminal information table of the authentication system 11A, and is also transmitted to the control system 31A (Steps 95 and 96 of FIG. 19). In this example, when the portable terminal 1A is authenticated in the authentication system 11A, in addition to data representing connection success, the wireless LAN information (as shown in FIG. 16A, medical instrument name, MAC address of the medical instrument, SSID, authentication method, password, and update date) of the examination control system 31 or the like are transmitted from the wireless LAN transmission/reception device 16 (wireless LAN information transmission unit) of the authentication system 11A to the portable terminal 1A (Step 97A of FIG. 19).

The data representing connection success transmitted from the authentication system 11A and the wireless LAN information of the examination control system are received in the portable terminal 1A (Step 84 of FIG. 18), the received wireless LAN information of the examination control system 31 or the like is set in the portable terminal 1A by the SSID setting device 8 (Step 85 of FIG. 18). The wireless LAN information of the examination control system 31 or the like being set in the portable terminal 1A, even when the SSID and the password need to be input at the time of wireless LAN communication with the examination control system 31 of the first examination room 30, or the like, the user of the portable terminal 1A does not need to input the SSID and the password.

Figure 20:
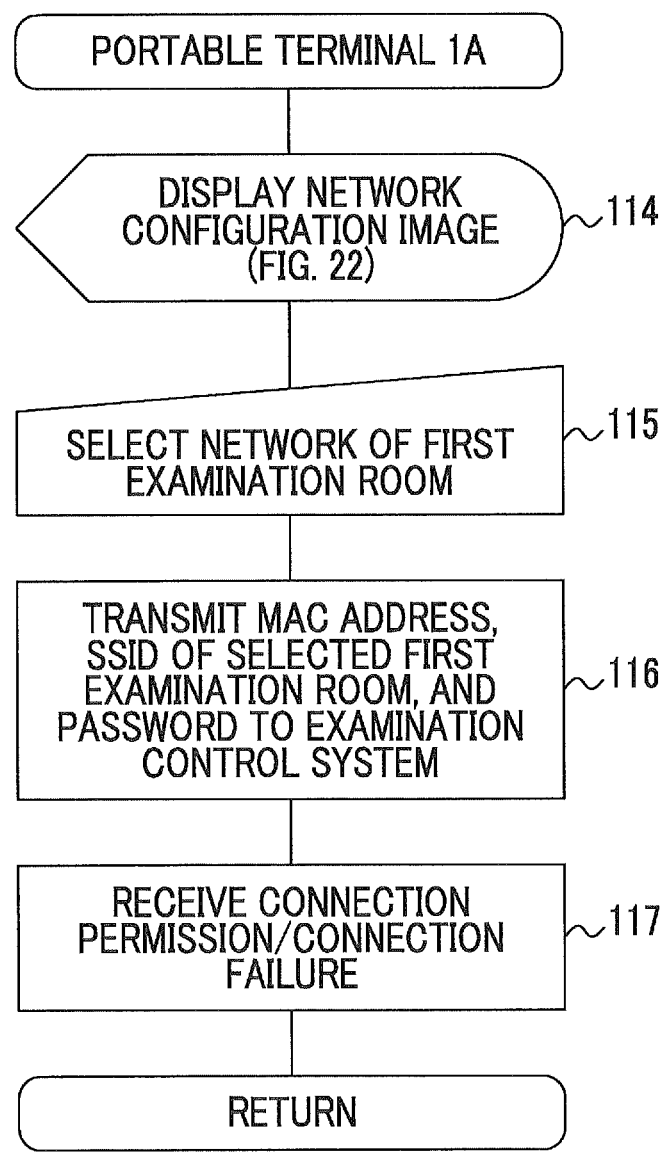
FIG. 20 is a flowchart showing a processing procedure of a portable terminal.
Figure 21:
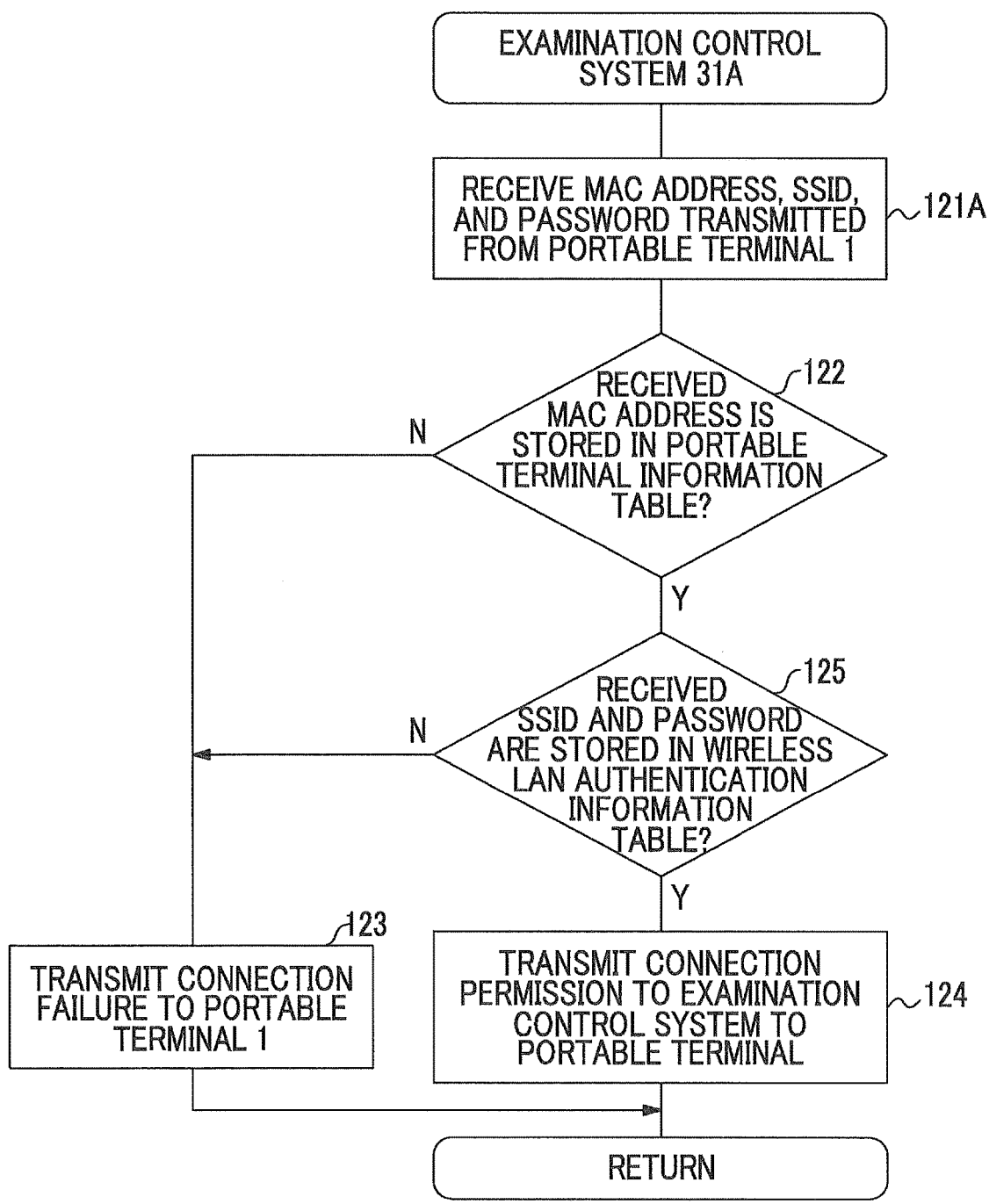
FIG. 21 is a flowchart showing a processing procedure of an examination control system.

FIGS. 20 and 21 show a processing procedure in which wireless LAN communication with the examination control system 31 of the first examination room 30 is performed using the portable terminal 1A in which the wireless LAN information of the examination control system 31 or the like is set as described above. The same applies to a processing procedure in which wireless LAN communication with the examination control system 61 of the second examination room 60 or the examination control system 71 of the third examination room 70 is performed using portable terminal 1A. FIG. 20 is a flowchart corresponding to FIG. 10 and showing a processing procedure of the portable terminal 1A. FIG. 21 is a flowchart corresponding to FIG. 11 and showing a processing procedure of the examination control system 31A. In FIG. 21, the same steps as the steps shown in FIG. 11 are represented by the same reference numerals, and description thereof will not be repeated. In this example, when the portable terminal 1A performs wireless LAN communication with the examination control system 31 which is arranged in the first examination room 30, the authentication processing using the SSID and the like is performed in the examination control system 31.

As described above, when the user with the portable terminal 1 in which the wireless LAN information of the examination control system 31 or the like is set enters the first examination room 30, the user allows a network configuration image to be displayed on the display screen of the portable terminal 1A (Step 114 of FIG. 20).

Figure 22:
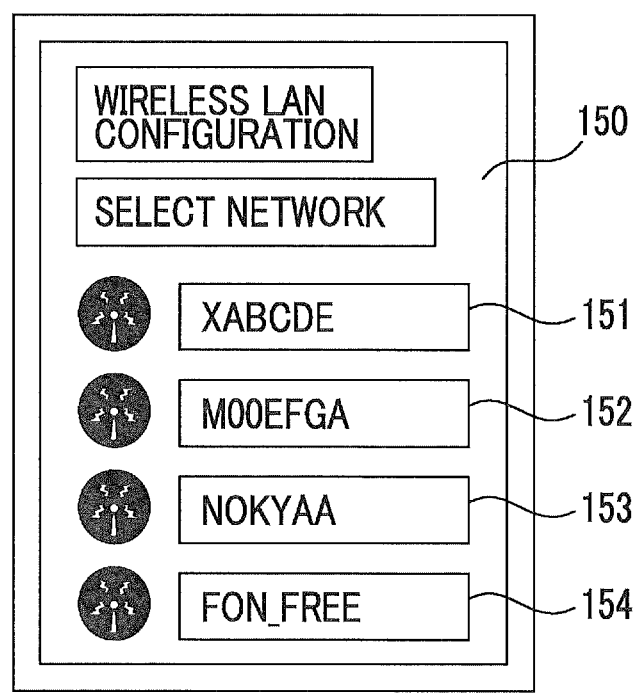
FIG. 22 shows an example of a wireless LAN configuration image.

FIG. 22 shows an example of a network configuration image which is displayed on a display screen 150 of the portable terminal 1A.

In the upper portion of the network configuration image, character strings of "wireless LAN configuration" and "select network" are displayed. Below these character strings, a list of SSIDs among the wireless LAN information of the examination control system 31 or the like set in the above-described manner is displayed. An SSID "XABCDE" 151 is the SSID of a wireless LAN of the examination control system 31 which controls the X-ray image diagnostic device 50 arranged in the first examination room 30. An SSID "M00EFGA" 152 is the SSID of the wireless LAN of the examination control system 61 which controls the mammography 62 arranged in the second examination room 60. An SSID "NOKYAA" 153 is the SSID of the wireless LAN of the examination control system 71 which controls the endoscope 72 arranged in the third examination room 70. An SSID "FON FREE" 154 is the SSID of a wireless LAN without access restrictions.

The user of the portable terminal 1A selects a desired SSID from among a list of SSIDs which is displayed on the display screen 150 of the portable terminal 1A. In this example, since the portable terminal 1A performs communication with the wireless LAN of the examination control system 31 arranged in the first examination room 30, the SSID "XABCDE" 151 is selected (touched) (Step 115 of FIG. 20). Then, the MAC address of the portable terminal 1A, the selected SSID "XABCDE", and the password are transmitted from the portable terminal 1A to the examination control system 31 (Step 116 of FIG. 20).

If the MAC address, SSID, and password transmitted from the portable terminal 1A are received in the examination control system 31A (Step 121A of FIG. 21), as described above, in order to confirm whether or not the portable terminal 1A is permitted to perform wireless LAN communication with the examination control system 31, it is confirmed by the portable terminal information control device 38 whether or not the MAC address of the portable terminal 1A is stored in the portable terminal information table (see FIG. 5) of the examination control system 31 (Step 122 of FIG. 21). If the MAC address of the portable terminal 1A is stored in the portable terminal information table of the examination control system 31 (YES in Step 122 of FIG. 21), as described above, it is understood that the portable terminal 1A is authenticated in the authentication system 11 of the medical office 10. Then, in this example, it is confirmed by the wireless LAN authentication control device 39 whether or not the SSID and password received in the examination control system 31A are stored in the wireless LAN authentication information table (see FIG. 25A) stored in the examination control system 31 (Step 125 of FIG. 21). If the received SSID and password are identical to the SSID and password which are stored in the wireless LAN authentication information table stored in the examination control system 31 (YES in Step 125 of FIG. 21), it is confirmed that the portable terminal 1A obtains the SSID and password from the authentication system 11. Then, the wireless LAN communication of the portable terminal 1A with the examination control system 31 is permitted, and connection permission data is transmitted from the examination control system 31A to the portable terminal 1A by the wireless LAN transmission/reception device 36 (Step 124 of FIG. 21).

In a case where the MAC address received in the examination control system 31A is not stored in the portable terminal information table of the examination control system 31A (NO in Step 122 of FIG. 21), or in a case where the SSID and password received in the examination control system 31A are not stored in the wireless LAN authentication information table of the examination control system 31A (NO in Step 125 of FIG. 21), data representing connection failure is transmitted from the examination control system 31A to the portable terminal 1A by the wireless LAN transmission/reception device 36 (Step 123 of FIG. 21).

In a case where the data representing connection permission transmitted from the examination control system 31A is received by the wireless LAN transmission/reception device 7 (wireless LAN information reception unit) of the portable terminal 1A (Step 117 of FIG. 20), the examination control system 31 can be operated using the portable terminal 1A. In a case where the data representing connection failure transmitted from the examination control system 31A is received by the wireless LAN transmission/reception device 7 of the portable terminal 1A (Step 117 of FIG. 20), the examination control system 31A cannot be operated using the portable terminal 1A.

In this example, since authentication on whether or not the portable terminal 1A can operate the examination control system 31A is performed using not only the MAC address but also the combination of the SSID and the password, security is further improved. Even if the SSID and the password need to be input at the time of wireless LAN communication with the examination control system 31A or the like, since the SSID and the password are set in the portable terminal 1A, the user does not need to input the SSID and the password.

Figure 23:
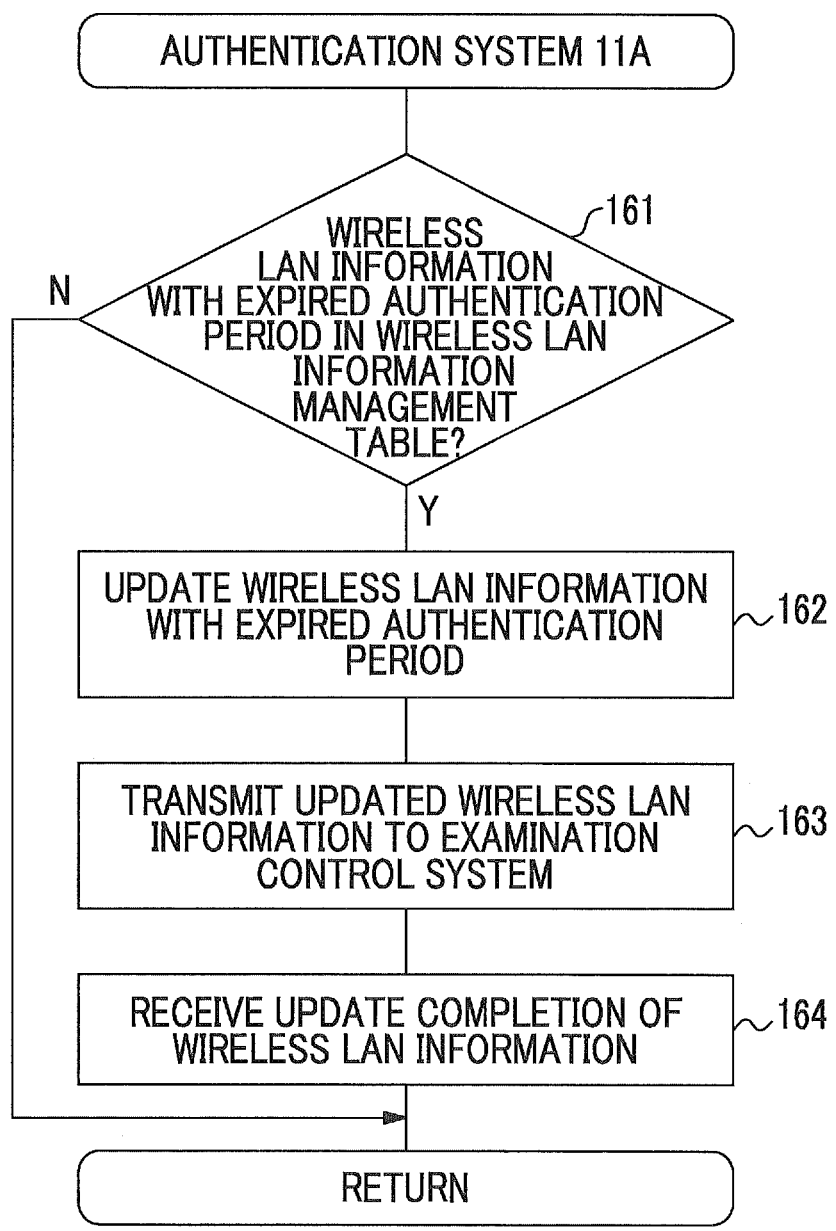
FIG. 23 is a flowchart showing a processing procedure of an authentication system.
Figure 24:
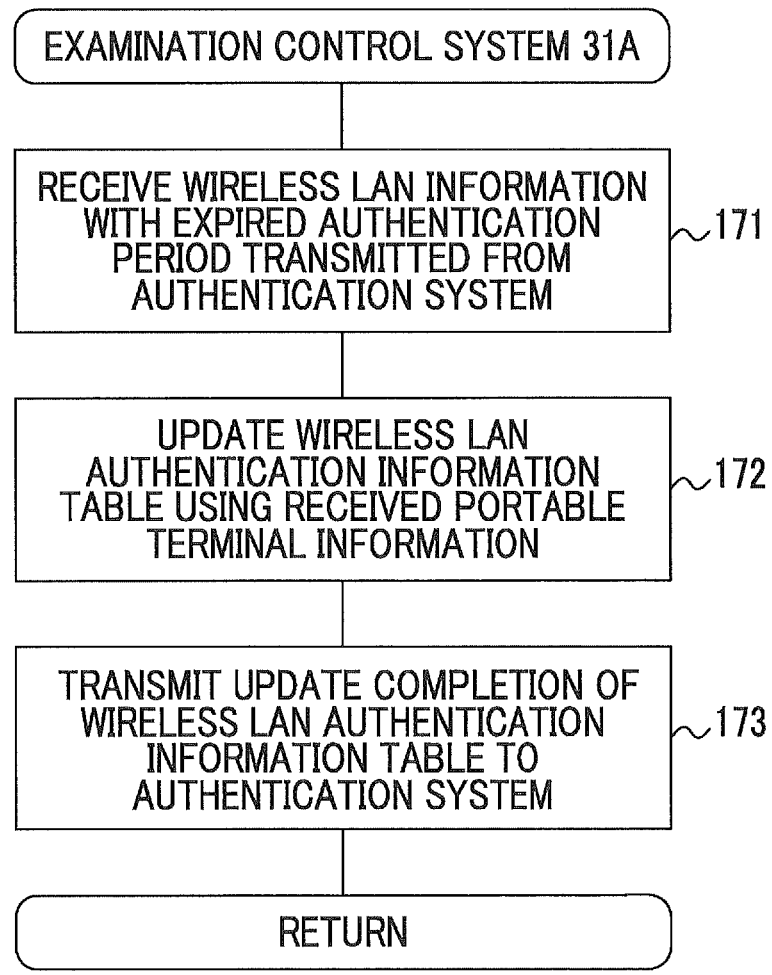
FIG. 24 is a flowchart showing a processing procedure of an examination control system.

FIGS. 23 and 24 are flowcharts showing an update processing procedure of a wireless LAN information management table. FIG. 23 is a flowchart corresponding to FIG. 12 and showing a processing procedure of the authentication system 11A, and FIG. 24 is a flowchart corresponding to FIG. 13 and showing a processing procedure of the examination control system 31A.

It is confirmed whether or not wireless LAN information with an expired authentication period is included in the wireless LAN information management table which is stored in the authentication system 11 arranged in the medical office 10 (Step 161 of FIG. 23). The wireless LAN information which is stored for longer than a predetermined period (for example, 12 hours, a day, or a week) from the last update date of the wireless LAN information management table is confirmed as the wireless LAN information with an expired authentication period.

If the wireless LAN information with the expired authentication period is included in the wireless LAN information management table (YES in Step 161 of FIG. 23), the wireless LAN information with the expired authentication period is updated by the portable terminal information control device 17 (second update unit) (Step 162 of FIG. 23).

FIG. 16B shows an example of a wireless LAN information management table after wireless LAN information is updated.

In the table after update shown in FIG. 16B, the SSID and the password are updated compared to the wireless LAN information which is stored in the table before update shown in FIG. 16A. The update date is brought up to date. For example, the SSID of the wireless LAN of the examination control system 31 which controls the X-ray image diagnostic device 50 is updated from "XABCDE" to "XXVFGD", and the password is updated from "abcd!!" to "ef!!gh". The update date is also updated from "12:00 a.m. on Feb. 10, 2012" to "12:00 a.m. on Feb. 11, 2012". The SSID of the wireless LAN of each of the examination control system 61 which controls the mammography 62 and the examination control system 71 which controls the endoscope 72, the password, and the update date are also updated.

When the wireless LAN information which is stored in the wireless LAN information management table stored in the authentication system 11 is updated, the updated wireless LAN information is transmitted from the wireless LAN information notification device 21 (updated content transmission unit) of the authentication system 11A to the examination control system corresponding to the updated wireless LAN information (Step 163 of FIG. 23). In the example shown in FIG. 16B, since the wireless LAN information of the examination control systems 31, 61, and 71 is updated as described above, the updated wireless LAN information is transmitted from the authentication system 11A to each of the examination control systems 31, 61, and 71. Hereinafter, a case where the updated wireless LAN information is transmitted to the examination control system 31 will be described.

When the updated wireless LAN information transmitted from the authentication system 11A is received in the examination control system 31A (Step 171 of FIG. 24), the wireless LAN authentication information table stored in the examination control system 31A is updated by the wireless LAN authentication control device 39 (first update unit) using the received wireless LAN information (Step 172 of FIG. 24).

FIGS. 25A and 25B show an example of the wireless LAN authentication information table which is stored in the examination control system 31. FIG. 25A shows an example of the wireless LAN authentication information table before update, and FIG. 25B shows an example of the wireless LAN authentication information table after update.

Referring to FIG. 25A, the same SSID, authentication method, and password as the wireless LAN information stored in the wireless LAN information management table before update shown in FIG. 16A are stored in the wireless LAN authentication information table before update. As described above, when the updated wireless LAN information is received, the received wireless LAN information is stored in the wireless LAN authentication information table. Accordingly, as shown in FIG. 16B, the wireless LAN authentication information table is updated.

Since the wireless LAN information management table which is stored in the authentication system 11 is updated every predetermined period, the user who has obtained authentication once in the authentication system 11 of the medical office 10 cannot carry out operation in the examination control system 31 or the like in a case where the predetermined period has elapsed. Since the wireless LAN authentication information table which is stored in the examination control system 31 (the same applies to other examination control systems 61 and 71) is updated corresponding to the update of the wireless LAN information management table which is stored in the authentication system 11, if authentication is obtained using the wireless LAN information management table after update, the user can operate the examination control system 31.

When the wireless LAN authentication information table is updated in the examination control system 31A, data representing the update completion is transmitted from the examination control system 31A to the authentication system 11A (Step 173 of FIG. 24).

Data representing the update completion of the wireless LAN authentication information table transmitted from the examination control system 31A is received in the authentication system 11A (Step 164 of FIG. 23).

Although in the foregoing examples, a case where medical instrument in a hospital is controlled has been described, the invention may be of course applied to a case where a variety of instruments in addition to the medical instrument are operated using a terminal device.

Although in the foregoing examples, the wireless LAN information is transmitted from the authentication system 11A to the portable terminal 1A, and the portable terminal 1A which receives the wireless LAN information automatically sets the wireless LAN information, the wireless LAN information may be transmitted from the authentication system 11A to the portable terminal 1A by an electronic mail or the like, and the user of the portable terminal 1A may manually set the wireless LAN information.

What is claimed is:

1. An operation management system comprising:
an authentication system;
a control system which is operated by an operation portable terminal device; and
a device which is connected with the control system and is operated by the operation portable terminal device,
wherein the control system is arranged outside an authentication zone,
wherein the authentication system includes:
a first terminal identification information reception unit that receives terminal identification information transmitted from the operation portable terminal device as the operation portable terminal device enters the authentication zone, the terminal identification information being uniquely set for the operation portable terminal device; and
a terminal identification information transmission unit that transmits the terminal identification information received by the first terminal identification information reception unit to the control system, and
wherein the control system includes:
a second terminal identification information reception unit that receives the terminal identification information transmitted from the terminal identification information transmission unit of the authentication system;
a first terminal identification information storage unit that stores the terminal identification information received by the second terminal identification information reception unit for a predetermined period;
a third terminal identification information reception unit that receives the terminal identification information transmitted directly from the operation portable terminal device as the operation portable terminal device enters an area where the control system is arranged, the terminal identification information being uniquely set for the operation portable terminal device; and
a permission unit that permits operation of the control system to control the device by the operation portable terminal device through confirming that the terminal identification information received by the third terminal identification information reception unit is stored in the first terminal identification information storage unit,
wherein the permission unit permits only the operation of the control system,
wherein the device comprises an examination device,
wherein the control system comprises an examination control system,
wherein the authentication system further comprises a first processor configured to control the first terminal identification information reception unit, and the terminal identification information transmission unit,
the first terminal identification information reception unit comprises, a first terminal identification information reception device, and the terminal identification information transmission unit comprises a terminal identification information transmission device, and
wherein the control system further comprises a second processor controlling the second terminal identification information reception unit, the first terminal identification information storage unit, the third terminal identification information reception unit, and the permission unit,
the second terminal identification information reception unit comprises a second terminal identification information reception device, the first terminal identification information storage unit comprises a first terminal identification information storage device, the third terminal identification information reception unit comprises a third terminal identification information reception device, and the permission unit comprises a permission control device including a third processor.

2. The operation management system according to claim 1,
wherein the authentication system further includes:
a second terminal identification information storage unit that stores the terminal identification information received by the first terminal identification information reception unit; and
a specific command transmission unit that transmits a specific command for specifying the terminal identification information which is stored for longer than a predetermined period since the terminal identification information is stored from among the terminal identification information stored in the second terminal identification information storage unit to the control system, and
wherein the control system further includes:
a specific command reception unit that receives the specific command transmitted from the specific command transmission unit of the authentication system; and
a first erasure unit that erases terminal identification information specified by the specific command received by the specific command reception unit from among the terminal identification information stored in the first terminal identification information storage unit.

3. The operation management system according to claim 2,
wherein the control system further includes:
an erasure completion data transmission unit that transmits erasure completion data to the authentication system as the terminal identification information is erased by the first erasure unit, and
wherein the authentication system further includes:
an erasure completion data reception unit that receives the erasure completion data transmitted from the erasure completion data transmission unit of the control system; and a second erasure unit that erases the terminal identification information specified by the specific command from the second terminal identification information storage unit as the erasure completion data is received by the erasure completion data reception unit.

4. The operation management system according to claim 3,
wherein the authentication system further includes an authentication unit that performs authentication processing as the operation portable terminal device enters the authentication zone, and
wherein the terminal identification information transmission unit of the authentication system transmits the terminal identification information to the control system as being authenticated by the authentication unit.

5. The operation management system according to claim 3,
wherein the first terminal identification information reception unit of the authentication system and the third terminal identification information reception unit of the control system receive the terminal identification information transmitted from the operation portable terminal device through a wireless LAN.

6. The operation management system according to claim 2,
wherein the authentication system further includes an authentication unit that performs authentication processing as the operation portable terminal device enters the authentication zone, and
wherein the terminal identification information transmission unit of the authentication system transmits the terminal identification information to the control system as being authenticated by the authentication unit.

7. The operation management system according to claim 2,
wherein the first terminal identification information reception unit of the authentication system and the third terminal identification information reception unit of the control system receive the terminal identification information transmitted from the operation portable terminal device through a wireless LAN.

8. The operation management system according to claim 1,
wherein the authentication system further includes an authentication unit that performs authentication processing as the operation portable terminal device enters the authentication zone, and
wherein the terminal identification information transmission unit of the authentication system transmits the terminal identification information to the control system as being authenticated by the authentication unit.

9. The operation management system according to claim 8,
wherein the first terminal identification information reception unit of the authentication system and the third terminal identification information reception unit of the control system receive the terminal identification information transmitted from the operation portable terminal device through a wireless LAN.

10. The operation management system according to claim 1,
wherein the first terminal identification information reception unit of the authentication system and the third terminal identification information reception unit of the control system receive the terminal identification information transmitted from the operation portable terminal device through a wireless LAN (Local Area Network).

11. The operation management system according to claim 10,
wherein the control system further includes a first wireless LAN information storage unit that stores wireless LAN information for communicating with the operation portable terminal device through the wireless LAN, and
wherein the authentication system further includes:
a second wireless LAN information storage unit that stores the wireless LAN information stored in the first wireless LAN information storage unit of the control system; and
a wireless LAN information transmission unit that transmits the wireless LAN information stored in the second wireless LAN information storage unit to the operation portable terminal device as the operation portable terminal device enters the authentication zone.

12. The operation management system according to claim 11,
wherein the control system further includes a first update unit that updates the wireless LAN information stored in the first wireless LAN information storage unit of the control system every predetermined period, and
wherein the authentication system further includes a second update unit that updates the wireless LAN information stored in the second wireless LAN information storage unit of the authentication system every predetermined period.

13. The operation management system according to claim 12,
wherein the authentication system further includes an updated content transmission unit that transmits an update content to the control system as the wireless LAN information stored in the second wireless LAN information storage unit is updated by the second update unit,
wherein the control system further includes an updated content reception unit that receives the updated content transmitted from the updated content transmission unit of the authentication system, and
wherein the first update unit of the control system updates the first wireless LAN information storage unit to the updated content received by the updated content reception unit.

14. The operation management system according to claim 13,
wherein the operation portable terminal device includes:
a wireless LAN information reception unit that receives the wireless LAN information transmitted from the wireless LAN information transmission unit of the authentication system; and
a wireless LAN information setting unit that sets, in the operation portable terminal device, the wireless LAN information received by the wireless LAN information reception unit.

15. The operation management system according to claim 12,
wherein the operation portable terminal device includes:
a wireless LAN information reception unit that receives the wireless LAN information transmitted from the wireless LAN information transmission unit of the authentication system; and a wireless LAN information setting unit that sets, in the operation portable terminal device, the wireless LAN information received by the wireless LAN information reception unit.

16. The operation management system according to claim 11, herein the operation portable terminal device includes:
a wireless LAN information reception unit that receives the wireless LAN information transmitted from the wireless LAN information transmission unit of the authentication system; and
a wireless LAN information setting unit that sets, in the operation portable terminal device, the wireless LAN information received by the wireless LAN information reception unit.

17. The operation manager ent system according to claim 1, further comprising:

a plurality of the control systems, wherein each of the control systems is operated by the operation portable terminal device respectively; and
a plurality of the devices which are connected with each control system and are operated by the operation portable terminal device,
wherein the control systems are arranged outside the authentication zone,
wherein the authentication system includes:
the first terminal identification information reception unit that receives the terminal identification information transmitted from the operation portable terminal device as the operation portable terminal device enters the authentication zone, the terminal identification information being uniquely set for the operation portable terminal device; and
the terminal identification information transmission unit that transmits the terminal identification information received by the first terminal identification information reception unit to the control systems, and
wherein each of the plurality of the control systems include:
the second terminal identification information reception unit that receives the terminal identification information transmitted from the terminal identification information transmission unit of the authentication system;
the first terminal identification information storage unit that stores the terminal identification information received by the second terminal identification information reception unit for the predetermined period;
the third terminal identification information reception unit that receives the terminal identification information transmitted directly from the operation portable terminal device as the operation portable terminal device enters the area where the control system is arranged, the terminal identification information being uniquely set for the operation portable terminal device; and
the permission unit that permits operation of the control system to control the device connected with the control system by the operation portable terminal device through confirming that the terminal identification information received by the third terminal identification information reception unit is stored in the first terminal identification information storage unit.

* * * * *